US011359764B2

(12) United States Patent
Chen

(10) Patent No.: US 11,359,764 B2
(45) Date of Patent: Jun. 14, 2022

(54) SHOULDERING TYPE PHOTOGRAPHING SUPPORT

(71) Applicant: Xiaoming Chen, Richmond Hill (CA)

(72) Inventor: Xiaoming Chen, Richmond Hill (CA)

(73) Assignee: Xiaoming Chen, Richmond Hill (CA)

( * ) Notice: Subject to any disclaimer, the term of this patent is extended or adjusted under 35 U.S.C. 154(b) by 728 days.

(21) Appl. No.: 16/198,369

(22) Filed: Nov. 21, 2018

(65) Prior Publication Data

US 2019/0186516 A1  Jun. 20, 2019

Related U.S. Application Data

(63) Continuation of application No. 16/144,091, filed on Sep. 27, 2018, now Pat. No. 11,215,208, which is a
(Continued)

(30) Foreign Application Priority Data

Nov. 24, 2017 (CN) .......................... 201721602331.8
Nov. 24, 2017 (CN) ......................... 201721602433.X

(51) Int. Cl.
*F16M 13/04* (2006.01)
*F16B 2/18* (2006.01)
(Continued)

(52) U.S. Cl.
CPC ............. *F16M 13/04* (2013.01); *F16B 2/185* (2013.01); *F16C 11/0661* (2013.01);
(Continued)

(58) Field of Classification Search
CPC . F16B 2/185; F16B 2/10; F16B 7/042; G03B 17/561; F16M 11/26; F16M 11/38;
(Continued)

(56) References Cited

U.S. PATENT DOCUMENTS 2,016,744 A 10/1935 Heck
2,483,711 A 10/1949 Roos
(Continued)

FOREIGN PATENT DOCUMENTS

CN 2127267 Y 2/1993
CN 201250992 A 6/2009
(Continued)

OTHER PUBLICATIONS

International Search Report and Written Opinion (including English translation) dated Jul. 31, 2018 for PCT/CN2017/112748 (pp. 1-13).
(Continued)

*Primary Examiner* — Muhammad Ijaz
(74) *Attorney, Agent, or Firm* — Arch & Lake LLP

(57) ABSTRACT

A shouldering type photographing support is provided, comprising a main frame for coupling components, on which at least one connecting base for fixing a lens or camera is provided; a shouldering assembly connected to the main frame, wherein the shouldering assembly being provided on a side of one end of the main frame and not in the same axis as the connecting base, and the shouldering assembly being located in the left rear or right rear of the at least one connecting base; and a supporting assembly connected to the main frame, wherein the supporting assembly comprises a chest-supporting assembly, arm-supporting assembly, handheld assembly and supporting leg assembly, the shouldering assembly and the supporting assembly together provide supporting at multiple points for the main frame.

19 Claims, 29 Drawing Sheets

Related U.S. Application Data continuation-in-part of application No. 15/973,943, filed on May 8, 2018, now Pat. No. 11,085,487, application No. 16/198,369, which is a continuation of application No. 15/957,334, filed on Apr. 19, 2018, now Pat. No. 10,371,317.

(51) Int. Cl.

| | | |
|---|---|---|
| *F16C 11/06* | (2006.01) | |
| *F16C 11/10* | (2006.01) | |
| *F16M 11/10* | (2006.01) | |
| *F16M 13/02* | (2006.01) | |
| *F16M 11/38* | (2006.01) | |
| *F16M 11/28* | (2006.01) | |
| *F16M 11/26* | (2006.01) | |
| *G03B 17/56* | (2021.01) | |

(52) U.S. Cl.
CPC ............ *F16C 11/10* (2013.01); *F16C 11/103* (2013.01); *F16M 11/10* (2013.01); *F16M 11/26* (2013.01); *F16M 11/28* (2013.01); *F16M 11/38* (2013.01); *F16M 13/022* (2013.01); *G03B 17/561* (2013.01); *F16M 2200/021* (2013.01); *F16M 2200/024* (2013.01); *F16M 2200/068* (2013.01)

(58) Field of Classification Search
CPC ...... F16M 11/28; F16M 13/04; F16M 13/022; F16M 11/10; F16M 2200/068; F16M 2200/024; F16M 2200/021; F16C 11/103; F16C 11/0661; F16C 11/10
USPC ............................................ 248/688, 221.11
See application file for complete search history.

(56) References Cited

U.S. PATENT DOCUMENTS

| | | | | |
|---|---|---|---|---|
| 4,437,753 | A | * | 3/1984 | Dunn .................... F16M 11/14 396/420 |
| 4,463,632 | A | | 8/1984 | Parke |
| 4,525,052 | A | | 6/1985 | Kosugi |
| 4,570,887 | A | | 2/1986 | Banister |
| 4,640,481 | A | | 2/1987 | Kohno |
| 5,111,983 | A | | 5/1992 | Simmons |
| 5,327,791 | A | | 7/1994 | Walker |
| 5,528,325 | A | | 6/1996 | Perez |
| 5,612,756 | A | * | 3/1997 | Kardach ........... F16M 11/2014 396/422 |
| 5,742,859 | A | | 4/1998 | Acker |
| 6,068,223 | A | * | 5/2000 | Navarro ................. F16M 11/14 224/265 |
| 6,216,317 | B1 | | 4/2001 | Chen |
| 6,216,567 | B1 | | 4/2001 | Hu |
| 6,244,759 | B1 | | 6/2001 | Russo |
| 6,435,738 | B1 | * | 8/2002 | Vogt ..................... F16M 11/041 396/419 |
| 6,520,053 | B2 | | 2/2003 | Liao |
| 6,767,153 | B1 | | 7/2004 | Holbrook |
| 6,773,172 | B1 | | 8/2004 | Johnson |
| 6,857,341 | B1 | | 2/2005 | Cheng |
| 7,082,862 | B2 | | 8/2006 | Lee |
| 7,174,815 | B1 | | 2/2007 | Hsieh |
| 7,185,862 | B1 | | 3/2007 | Yang |
| 7,237,460 | B2 | | 7/2007 | Hu |
| 7,559,167 | B1 | | 7/2009 | Moody |
| 7,658,556 | B2 | | 2/2010 | Johnson |
| 7,703,995 | B1 | * | 4/2010 | Sivan ................. F16M 11/2092 396/421 |
| 8,091,265 | B1 | * | 1/2012 | Teetzel .................... F41C 23/16 42/72 |
| 8,256,726 | B2 | | 9/2012 | Bordignon |
| 8,341,864 | B2 | | 1/2013 | Moody |
| 8,393,104 | B1 | | 3/2013 | Moody |
| 8,695,459 | B2 | | 4/2014 | Lee |
| 9,277,794 | B2 | | 3/2016 | Moreau |
| 9,452,515 | B2 | | 9/2016 | Lee |
| 9,568,281 | B1 | | 2/2017 | Chen |
| 9,612,506 | B1 | | 4/2017 | Webb |
| 9,638,243 | B2 | | 5/2017 | Li |
| 9,746,751 | B1 | | 8/2017 | Amit |
| 10,030,940 | B2 | * | 7/2018 | Sheets, Jr. ............... F41C 27/00 |
| 10,436,426 | B2 | | 10/2019 | Thomas |
| 2004/0217240 | A1 | | 11/2004 | Gordon |
| 2005/0041966 | A1 | | 2/2005 | Johnson |
| 2005/0207749 | A1 | | 9/2005 | Barker |
| 2005/0267600 | A1 | | 12/2005 | Haberman |
| 2006/0239677 | A1 | | 10/2006 | Friedrich |
| 2008/0006747 | A1 | | 1/2008 | Bobro |
| 2009/0045304 | A1 | | 2/2009 | Faifer |
| 2010/0084524 | A1 | | 4/2010 | Faifer |
| 2011/0297201 | A1 | | 12/2011 | Chen |
| 2012/0014744 | A1 | | 1/2012 | Lin |
| 2012/0167434 | A1 | | 7/2012 | Masters |
| 2013/0058639 | A1 | | 3/2013 | Galik |
| 2013/0233988 | A1 | | 9/2013 | Johnson |
| 2013/0287386 | A1 | | 10/2013 | Xu |
| 2014/0252187 | A1 | | 9/2014 | Petrovic |
| 2015/0288858 | A1 | | 10/2015 | Fee |
| 2015/0362122 | A1 | | 12/2015 | Brown |
| 2016/0245621 | A1 | | 8/2016 | Kintzing |
| 2017/0261157 | A1 | | 9/2017 | Guo |
| 2018/0155920 | A1 | | 6/2018 | Ovrum |
| 2018/0259298 | A1 | | 9/2018 | Gao |
| 2019/0186516 | A1 | | 6/2019 | Chen |

FOREIGN PATENT DOCUMENTS

| | | |
|---|---|---|
| CN | 102062994 A | 5/2011 |
| CN | 202469393 A | 10/2012 |
| CN | 203099236 U | 7/2013 |
| CN | 103279002 A | 9/2013 |
| CN | 203248942 U | 10/2013 |
| CN | 103470933 A | 12/2013 |
| CN | 203348864 A | 12/2013 |
| CN | 203799166 A | 8/2014 |
| CN | 203979802 A | 12/2014 |
| CN | 104544816 A | 4/2015 |
| CN | 105005170 A | 10/2015 |
| CN | 205299018 A | 6/2016 |
| CN | 205806871 A | 12/2016 |
| CN | 206431403 A | 8/2017 |
| CN | 206514025 A | 9/2017 |
| CN | 107356153 A | 11/2017 |
| CN | 107830387 A | 3/2018 |
| CN | 107859857 A | 3/2018 |
| CN | 107989888 A | 5/2018 |
| CN | 108006416 A | 5/2018 |
| CN | 207598706 A | 7/2018 |
| CN | 207599270 A | 7/2018 |
| CN | 207599314 A | 7/2018 |
| CN | 207601483 A | 7/2018 |
| CN | 207634958 U | 7/2018 |

OTHER PUBLICATIONS

International Search Report and Written Opinion (including English translation) dated Aug. 14, 2018 for PCT/CN2017/112749 (pp. 1-14).

International Search Report and Written Opinion (including English translation) dated Aug. 16, 2018 for PCT/CN2017/112745 (pp. 1-15).

International Search Report and Written Opinion (including English translation) dated Aug. 16, 2018 for PCT/CN2017/112747 (pp. 1-15).

International Search Report and Written Opinion (including English translation) dated Aug. 16, 2018 for PCT/CN2017112746 (pp. 1-17).

International Search Report and Written Opinion (including English translation) issued in PCT/CN2017/112744, 15 pages.

(56) References Cited

OTHER PUBLICATIONS

Office Action (Final Rejection) dated Jun. 18, 2019 for U.S. Appl. No. 16/198,376 (pp. 1-9).
Office Action (Final Rejection) dated Nov. 19, 2019 for U.S. Appl. No. 16/198,373 (pp. 1-9).
Office Action (Non-Final Rejection) dated Jan. 11, 2021 for U.S. Appl. No. 15/973,943 (pp. 1-11).
Office Action (Non-Final Rejection) dated Feb. 21, 2019 for U.S. Appl. No. 16/198,376 (pp. 1-9).
Office Action (Non-Final Rejection) dated Apr. 19, 2021 for U.S. Appl. No. 16/144,091 (pp. 1-11).
Office Action (Non-Final Rejection) dated Jun. 12, 2019 for U.S. Appl. No. 16/198,373 (pp. 1-6).
Office Action (Non-Final Rejection) dated Jul. 21, 2021 for U.S. Appl. No. 16/198,358 (pp. 1-12).
Office Action (Non-Final Rejection) dated Dec. 11, 2018 for U.S. Appl. No. 15/957,334 (pp. 1-8).
Office Action (Non-Final Rejection) dated Dec. 20, 2019 for U.S. Appl. No. 16/198,376 (pp. 1-12).
Office Action (Notice of Allowance and Fees Due (PTOL-85) dated Jan. 28, 2020 for U.S. Appl. No. 16/198,373 (pp. 1-8).
Office Action (Notice of Allowance and Fees Due (PTOL-85) dated Mar. 20, 2019 for U.S. Appl. No. 15/957,334 (pp. 1-9).
Office Action (Notice of Allowance and Fees Due (PTOL-85)) dated Mar. 25, 2020 for U.S. Appl. No. 16/198,376 (pp. 1-8).
Office Action (Notice of Allowance and Fees Due (PTOL-85) dated Apr. 7, 2021 for U.S. Appl. No. 15/973,943 (pp. 1-8).
Office Action (Notice of Allowance and Fees Due (PTOL-85) dated Apr. 28, 2020 for U.S. Appl. No. 16/198,376 (pp. 1-8).
Office Action (Notice of Allowance and Fees Due (PTOL-85) dated Jul. 28, 2021 for U.S. Appl. No. 16/144,091 (pp. 1-8).

* cited by examiner

SHOULDERING TYPE PHOTOGRAPHING SUPPORT

CROSS-REFERENCE TO RELATED APPLICATIONS

This application claims the benefit of CN Patent Application No. 201721602331. 8 filed 24 Nov. 2017, and claims the benefit of U.S. patent application Ser. No. 16/144,091 filed 27 Sep. 2018, and claims the benefit of U.S. patent application Ser. No. 15/957,334 filed 19 Apr. 2018, the entire disclosures of which are hereby incorporated herein by reference.

TECHNICAL FIELD OF THE INVENTION

The present disclosure relates to a camera stand and in particular to a shouldering type photographing support.

BACKGROUND TECHNOLOGY OF THE INVENTION

The camera stand, just as its name implies, is a stand for supporting a camera device and designed for photographers for convenience of photography. The most common existing camera stands are camera tripods. A holder is provided on the camera tripod, and a camera is fixedly mounted on the holder. The stability of the entire tripod and thus of the camera is realized by three support legs supported on the ground. This device has good stability, but is huge and heavy in structure, so it is not suitable for instant shooting and mobile shooting and is inconvenient to use. To overcome the defects of the tripod, a portable stand that is fixed on the waist or other parts of the human body and can move with the human body is also proposed in the prior art. However, such stand has the following defects: cumbersome structure, heavy load on the photographer, the photographer being required to turn his/her head aside for framing or photographing, and inconvenient operation. In addition, the camera stands in the conventional technologies cannot well realize multi-point fixation during the mobile shooting or quick framing, so it is very likely to result in picture flutters, thus causing picture blurring and seriously affecting the definition and stability of pictures.

Thus, there is a need for a portable stand that is capable of providing stability, light weight as well as convenience in use.

SUMMARY OF THE INVENTION

With respect to above issues, the present disclosure provides a shouldering type photographing support which is light in weight, suitable for instant shooting and mobile shooting, reliable in supporting and stable in shooting pictures.

According to several aspects, a shouldering type photographing support, comprising: a main frame for coupling components, on which at least one connecting base for fixing a lens or camera is provided; a shouldering assembly connected to the main frame, wherein the shouldering assembly being provided on a side of one end of the main frame and not in the same axis as the connecting base, and the shouldering assembly being located in the left rear or right rear of the at least one connecting base; and a supporting assembly connected to the main frame, wherein the supporting assembly comprises a chest-supporting assembly, arm-supporting assembly, handheld assembly and supporting leg assembly, the shouldering assembly and the supporting assembly together provide supporting at multiple points for the main frame.

The present disclosure has the following beneficial effects. In the present disclosure, by providing a shouldering assembly on a side of the main frame, the shouldering assembly acts as one of supporting points when in use, so that a load on a user's hands is relieved. Moreover, the shouldering assembly can move with the human body for mobile shooting or instant shooting, so the flexibility is improved; and, the shouldering assembly is not in the same axis as the connecting base but is located in the left rear or right rear of the connecting base, so that the position of the camera on the connecting base satisfies the ergonomic design and is located exactly at the eye position of the photographer. The photographer does not need to lean his/her head or turn his/her head aside to view the viewfinder or display screen in the camera, which is convenient for the photographer and alleviates the fatigue of the photographer. By connecting the shouldering assembly and the supporting assembly to the main frame, the main frame is skillfully supported at multiple points by the shouldering assembly and the supporting assembly. As a result, the stability of the camera stand is greatly improved, the flutters during shooting are reduced, high-quality shot pictures are effectively ensured, and the definition and stability of shot pictures are ensured. The shouldering type photographing support of the present disclosure is simple and compact in structure, easy to mount, light and handy in use and low in cost, is deeply favored and recommended by photographers through tests, and can be widely applied to the field of camera photography.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Further advantages and configurations are explained in more detail in the following text on the basis of preferred exemplary embodiments of the invention, and in conjunction with the accompanying drawings, in which.

DETAILED DESCRIPTION OF THE INVENTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1A:
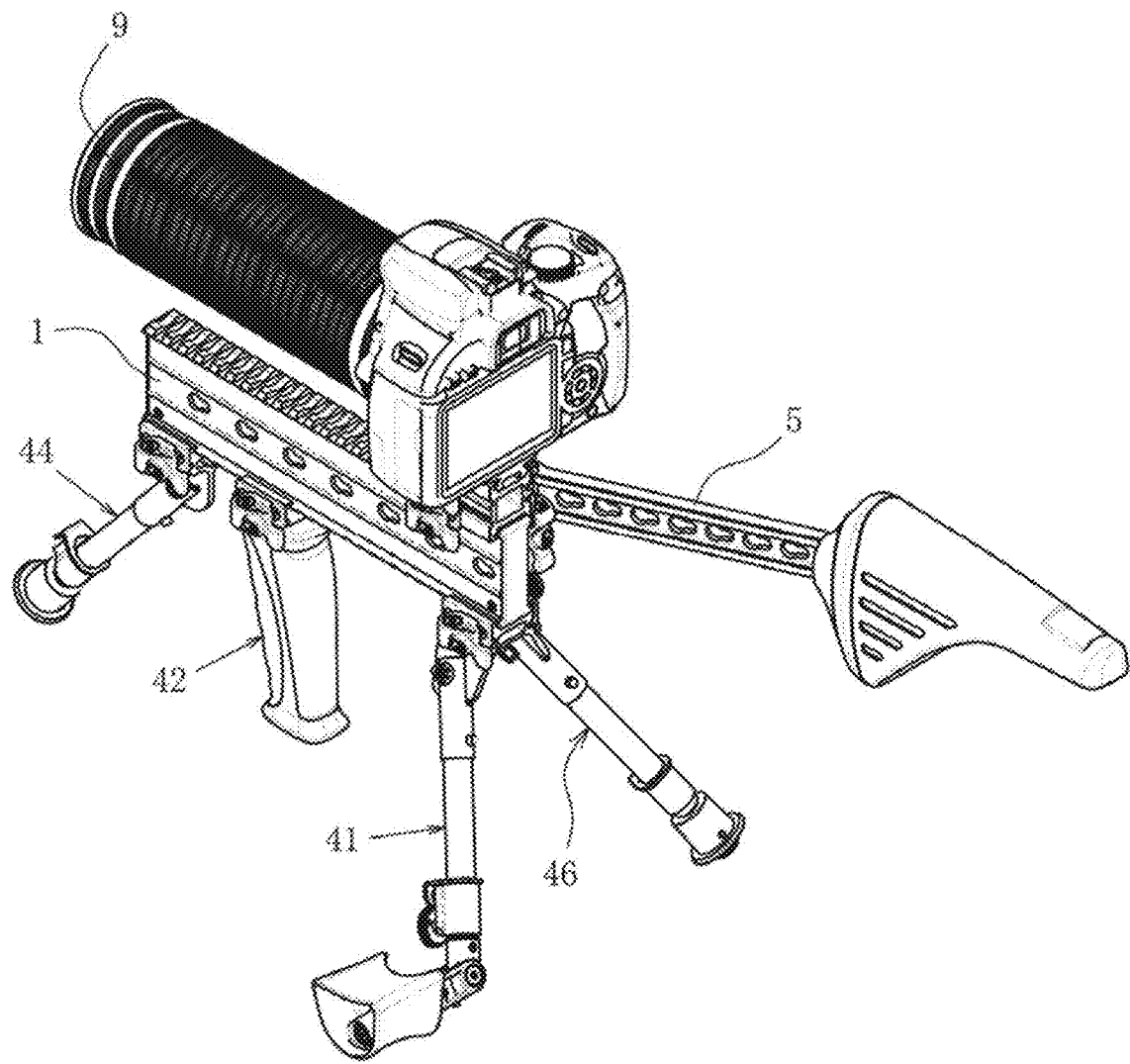
FIG. 1A shows a first example of a first embodiment of the shouldering type photographing support according to the present disclosure.
Figure 1B:
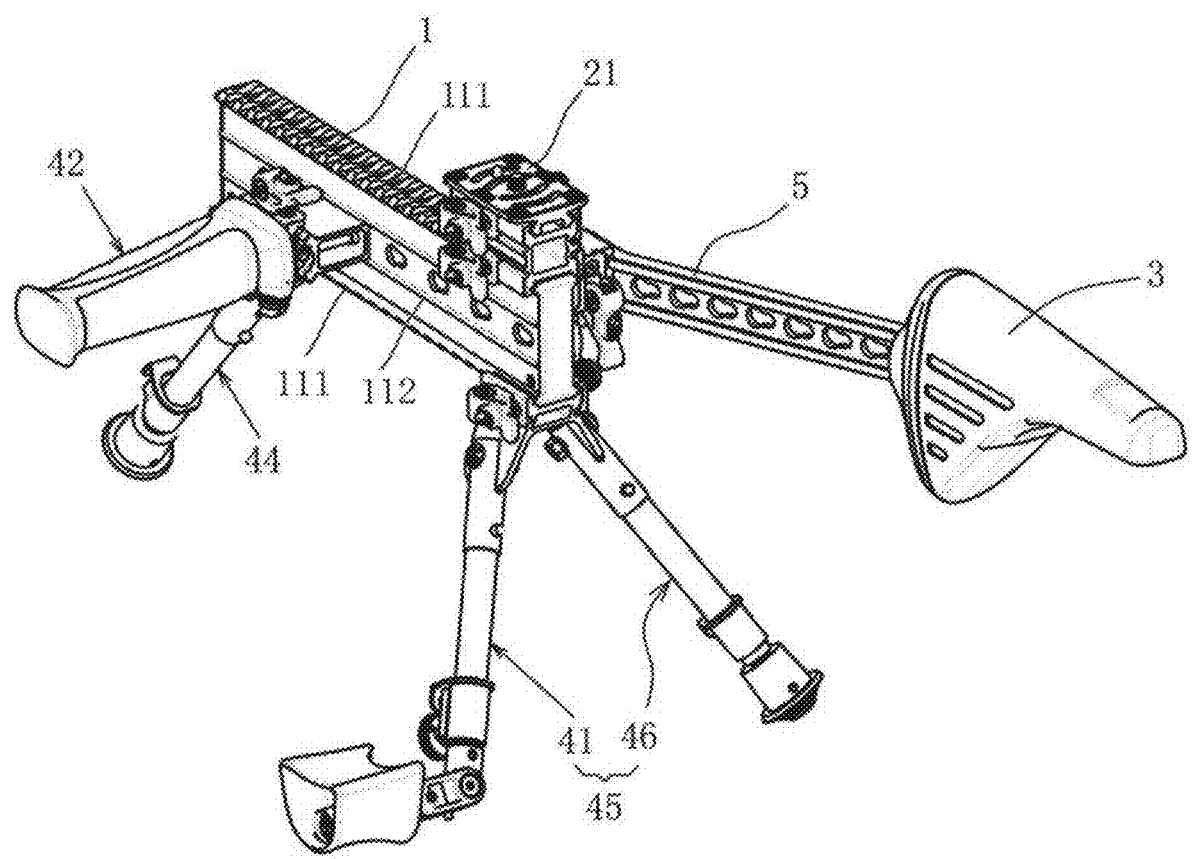
FIG. 1B shows a second example of the first embodiment of the shouldering type photographing support according to the present disclosure.
Figure 1C:
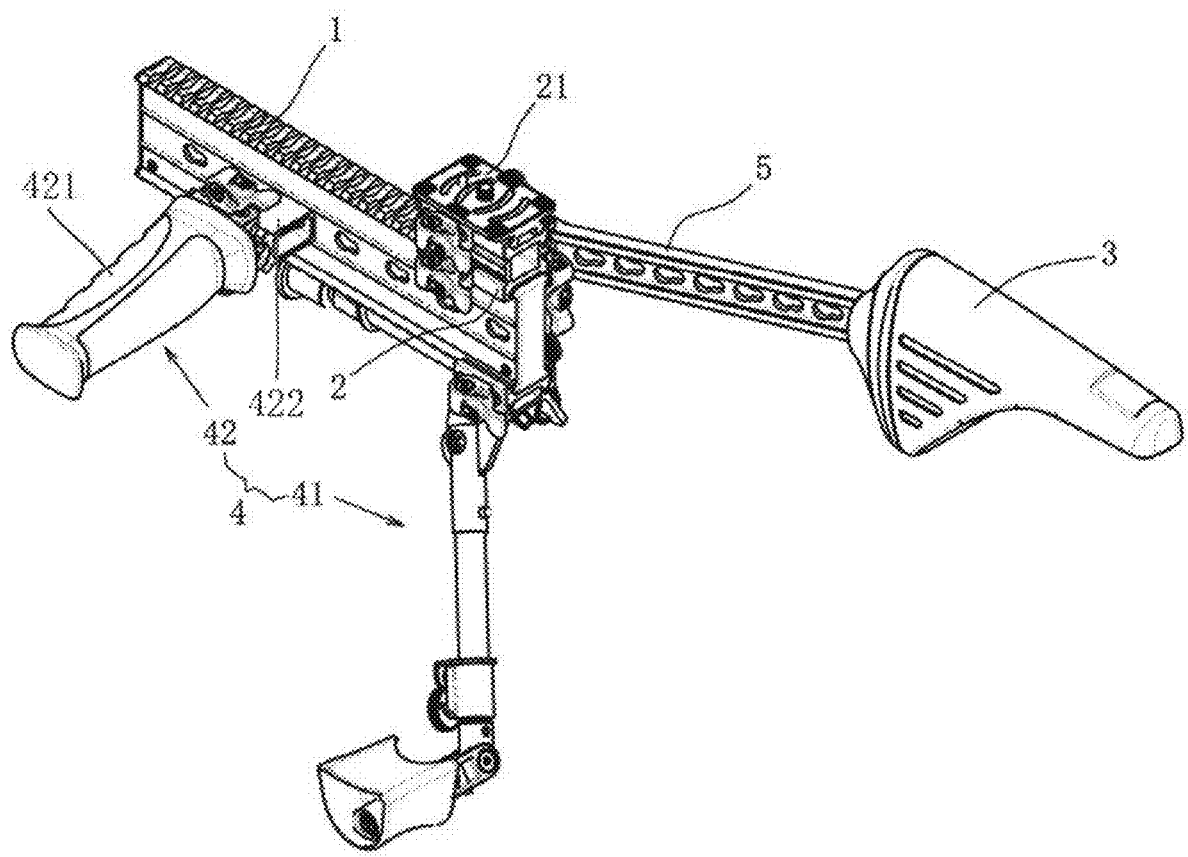
FIG. 1C shows a third example of the first embodiment of the shouldering type photographing support according to the present disclosure.
Figure 2:
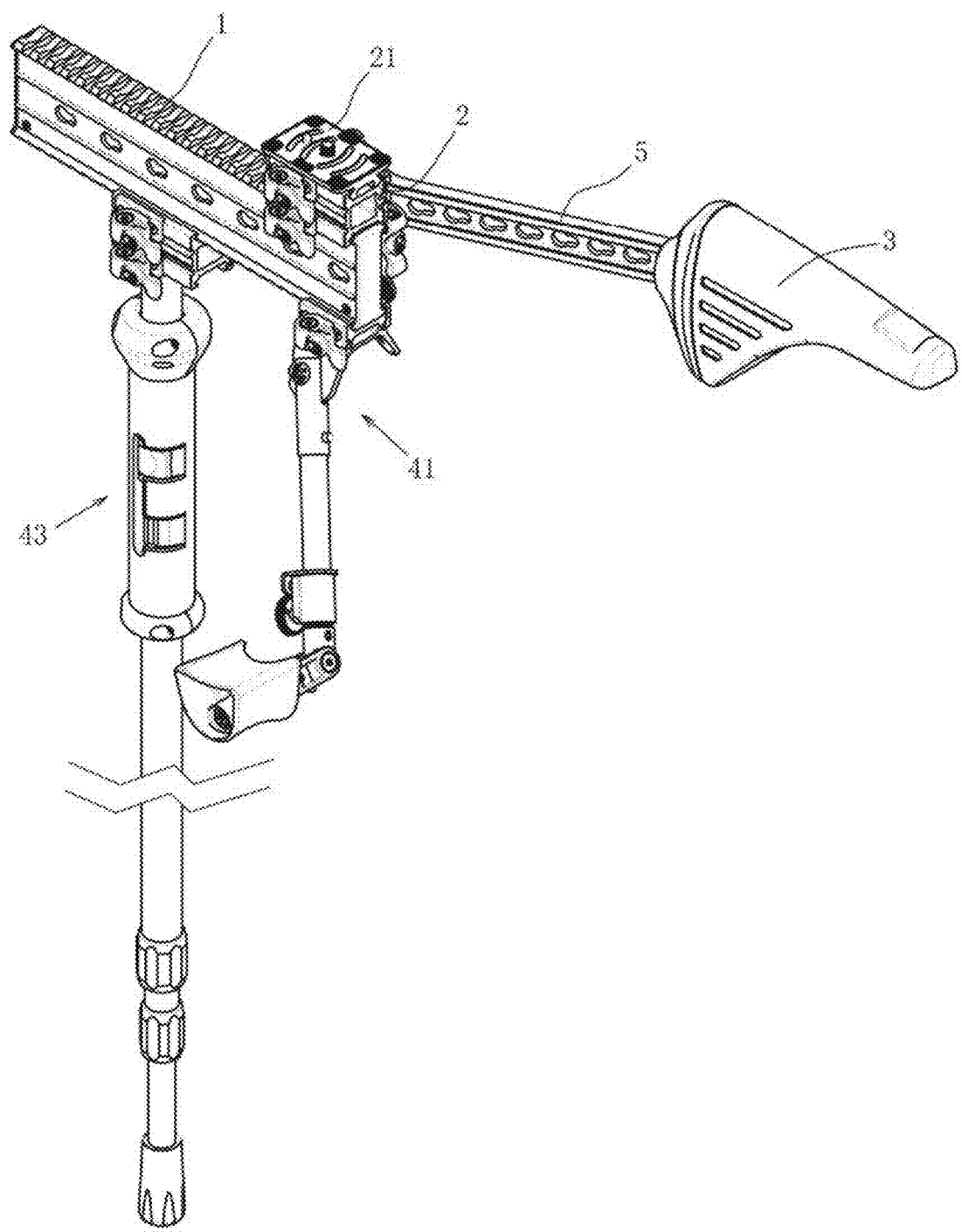
FIG. 2 shows a third embodiment of the shouldering type photographing support according to the present disclosure.
Figure 2A:
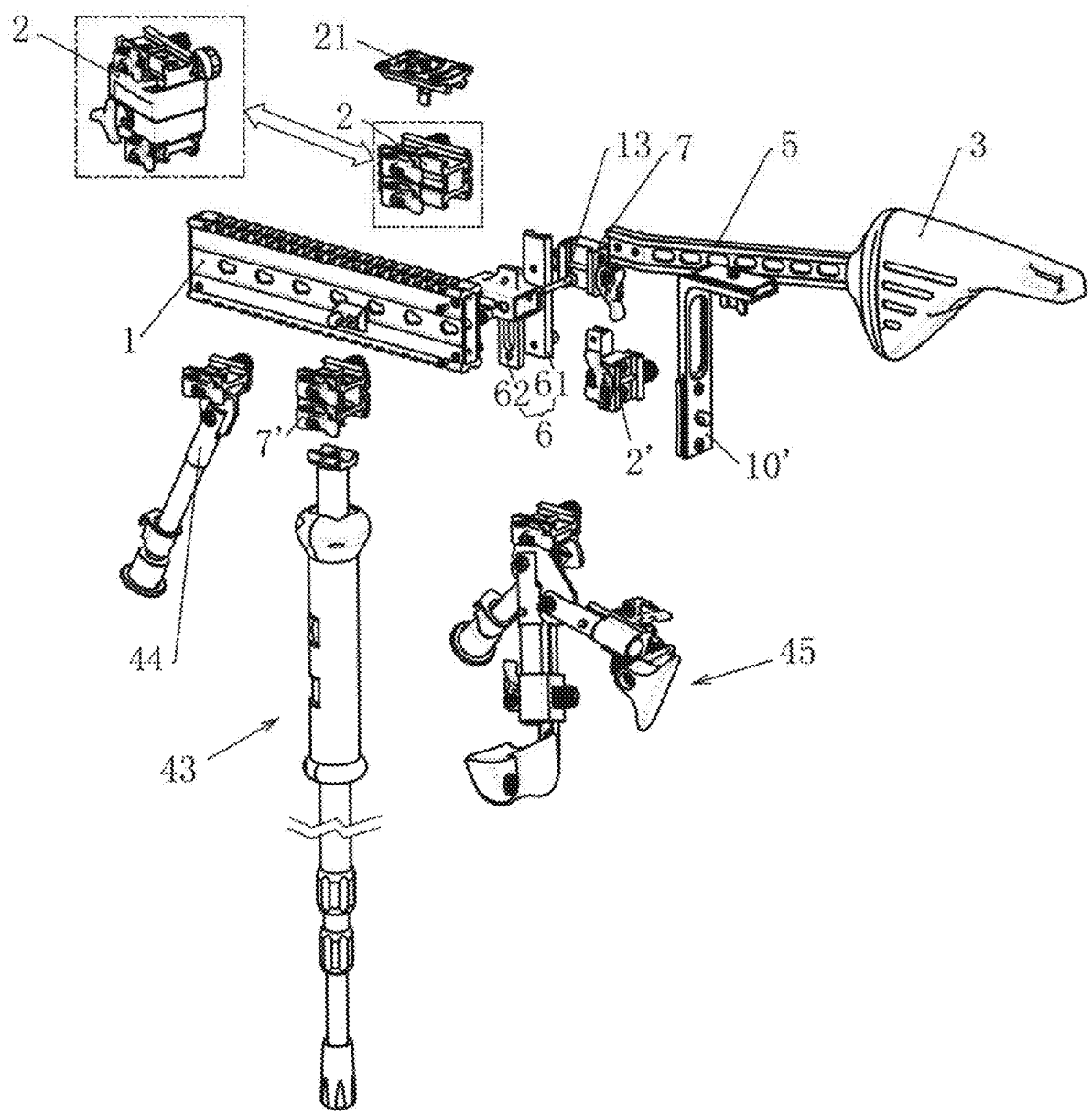
FIG. 2A is an exploded view showing a fourth embodiment of the shouldering type photographing support according to the present disclosure.
Figure 2B:
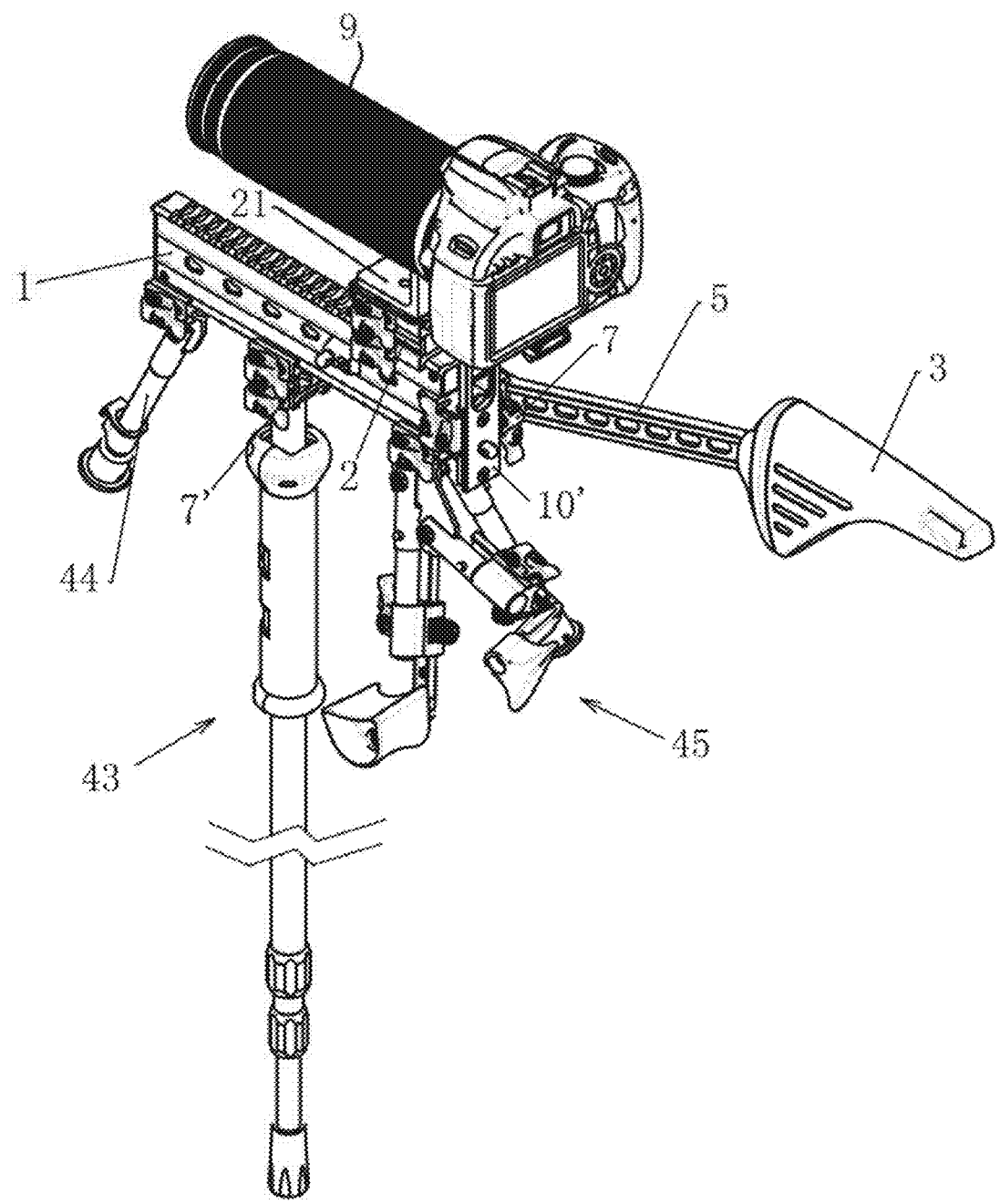
FIG. 2B shows the fourth embodiment of the shouldering type photographing support according to the present disclosure, wherein a camera and a lens are installed.
Figure 2C:
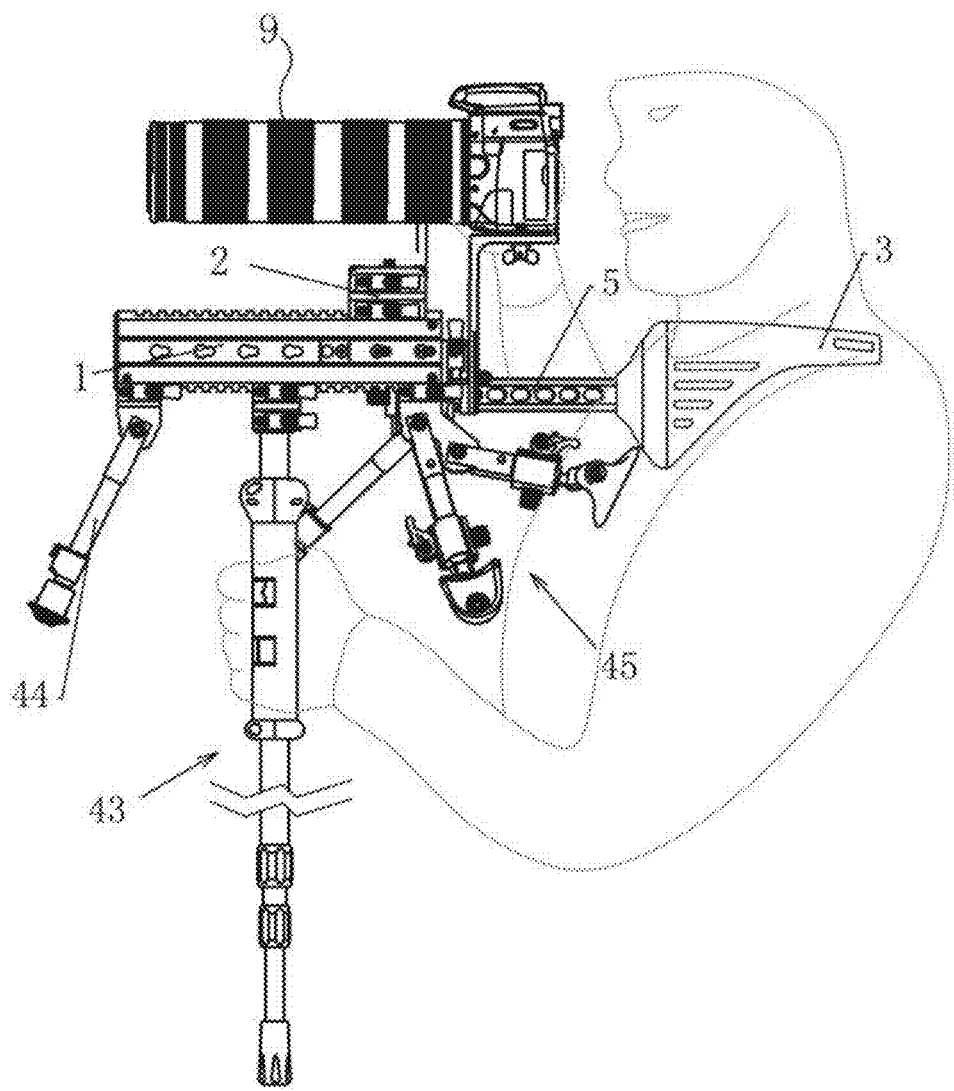
FIG. 2C shows the fourth embodiment of the shouldering type photographing support, in a shooting state, according to the present disclosure.
Figure 3:
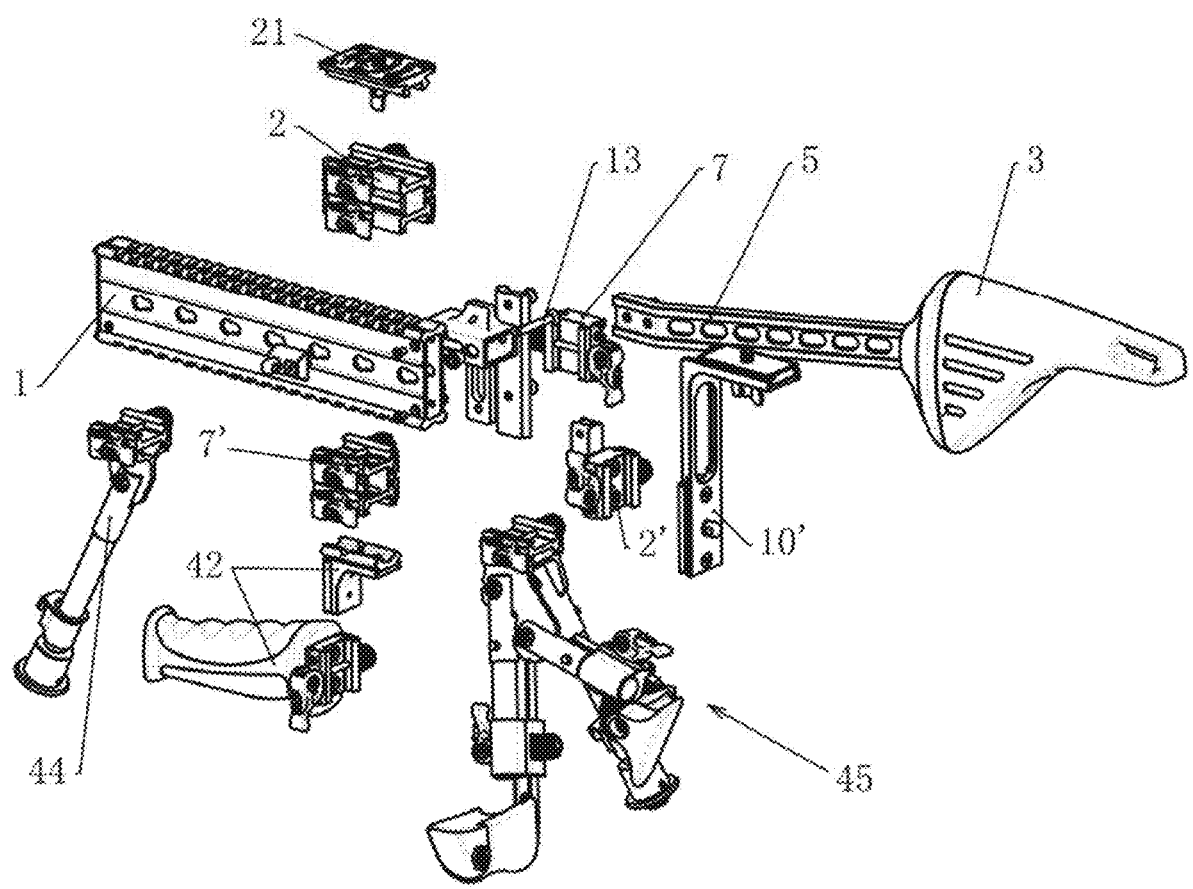
FIG. 3 is an exploded view showing a fifth embodiment of the shouldering type photographing support according to the present disclosure.
Figure 3A:
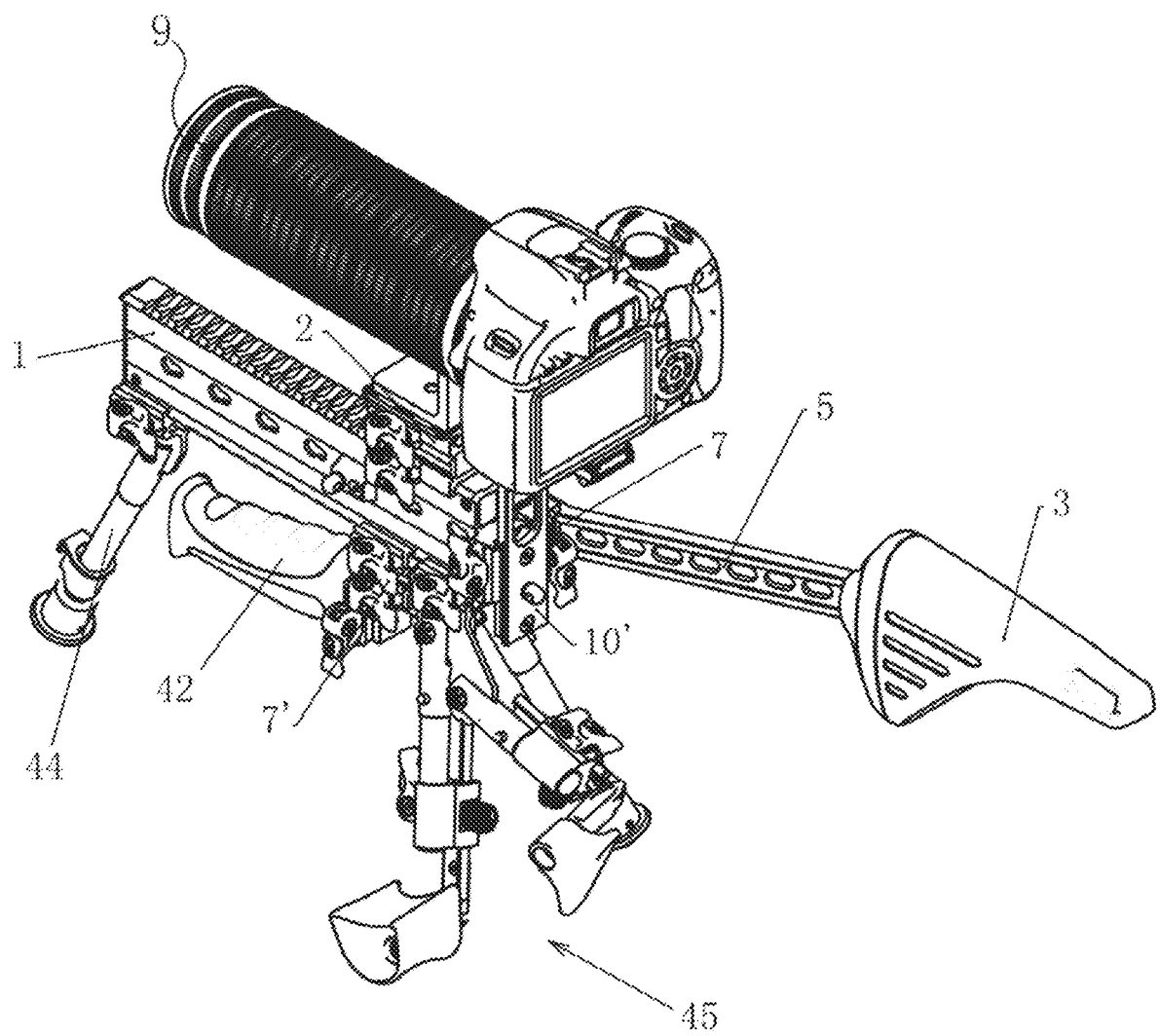
FIG. 3A shows the fifth embodiment of the shouldering type photographing support according to the present disclosure, wherein a camera and a lens are installed.
Figure 3B:
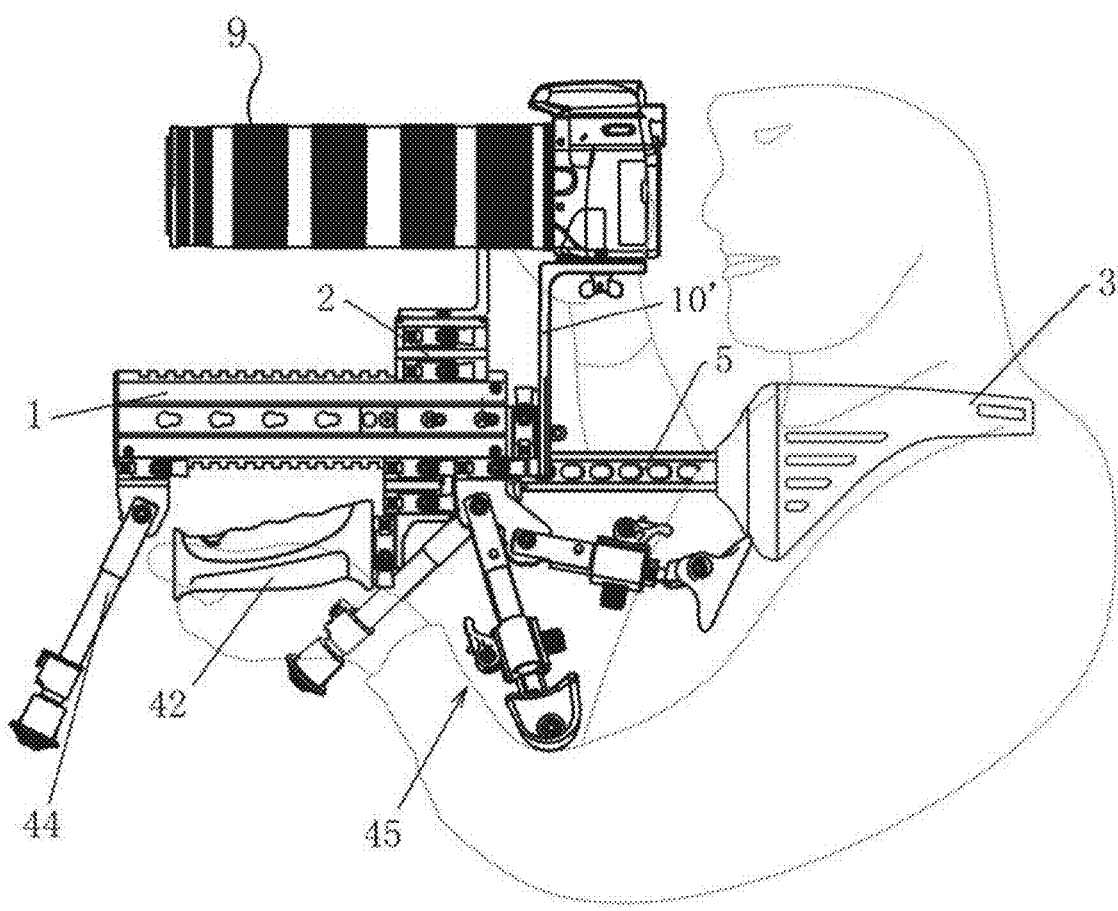
FIG. 3B shows the fifth embodiment of the shouldering type photographing support, in a shooting state, according to the present disclosure.

For clarity, the drawings are categorized as:

FIG. 1A-1C: the first embodiment;

FIG. 1D-1I: the second embodiment;

FIG. 2: the third embodiment;

FIG. 2A-2C: the fourth embodiment;

FIG. 3-3B: the fifth embodiment.

With reference to FIGS. 1A-1C, the shouldering type photographing support of the first embodiment according to the present disclosure is shown, comprising a main frame 1 for coupling components, for installing or securing various coupling components, wherein the main frame 1 has a cross-section of a hollow rectangle such that an interior of the main frame 1 is axially cut through, the main frame 1 has installation surfaces axially extending along the main frame 1; wherein at least one of the installation surfaces of the main frame 1 is provided with mounting holes 11 running through the installation surface. Optionally a positioning convex rail 112 can be provided on both sides of the mounting holes, axially along the main frame 1, according to practical needs, for guiding connecting components installed on the main frame 1. The coupling component is fastened on the installation surface of the main frame 1 by a shoulder nut 12. Specifically, the installation surface of the main frame 1 comprises an installation guide rail 111 provided on top and/or bottom of the main frame 1. Advantageously, two installation guide rails 111 are provided, respectively on top and bottom of the main frame 1. The installation guide rail 111 comprises a Picatinny rail or a trapezoidal rail, and the supporting assembly 4 is installed on the installation surface via a locking device.

To secure the camera, a connecting base 2 may be provided on the main frame 1. In some embodiments, the connecting base 2 is used for connecting a quick shoe plate (or can be referred to quick release plate) 21. The quick shoe plate 21 is the known structure in the camera field and used for securing and releasing a photographic equipment quickly such as an SLR camera 9. With the quick shoe plate, the camera can be secured on a camera mount, stand or support, it is convenient to quickly assemble or disassemble the photographic equipment such as an SLR camera. In some embodiments herein, the connecting base 2 can be a locking device, as indicated with reference number: 2, 2', 7, 7', for example, the locking device can be single way locking device 2', 7 or dual-ways locking device 2, 7', for detailed structure, please refer to the quick locking device described in another U.S. patent application Ser. No. 15/957,334 of the applicant, which is incorporated herein by reference in its entirety, the locking connection or so called snap-in connection thereof is mainly realized by a Picatinny rail or a trapezoidal rail.

In some embodiments herein, to prevent the quick locking device from loosening during locking due to collision, component fatigue or other reasons, a rotary positioning and locking mechanism may be provided. The positioning and locking mechanism is as described in another U.S. patent application Ser. No. 16/144,091 by the applicant, which is incorporated herein by reference in its entirety.

The shouldering type photographing support of the present disclosure further includes a shouldering assembly 3 and a supporting assembly 4 both connected to the main frame 1. The shouldering assembly 3 is arranged on a side of the main frame 1 and not in the same axis as the connecting base 2. The shouldering assembly 3 may be located in the left rear or right rear of the connecting base 2. Considering the general habits of photographers, in some embodiments, the shouldering assembly 3 may be arranged in the right rear of the connecting base 2. During photographing, the main frame 1 is supported by the shouldering assembly 3 and the supporting assembly 4. Therefore, the shouldering assembly 3 and the supporting assembly 4 together provide supporting at multiple points for the main frame 1.

Still refer to FIG. 1A-1C, the working principle of the shouldering type photographing support of the present disclosure, when the supporting assembly 4 comprises an arm-supporting assembly or a chest-supporting assembly 41 and a handheld assembly 42, will be described below. In some embodiments, the arm-supporting assembly or chest-supporting assembly 41 and the handheld assembly 42 are connected to the main frame 1 by a locking device such as a quick locking device 7', 836. Referring to FIG. 1A, the handheld assembly 42 may be arranged on the bottom of the main frame 1 in such a way that the handheld assembly extends downward perpendicularly (or refer to vertically). Referring to FIGS. 1B and 1C, the handheld assembly 42 may be arranged on a side of the main frame 1 in such a way that the handheld assembly extends roughly perpendicularly (or refer to vertically) to the main frame 1.

Referring to FIGS. 1D-1H, as the first, second example of the second embodiment, the handheld assembly 42 may be arranged on the bottom of the main frame 1 in such a way that the handheld assembly extends axially parallel to the main frame 1. It is to be noted that, although the arm-supporting assembly is used in FIGS. 1A, 1B and 1C and the chest-supporting assembly is used in FIGS. 1D and 1E, this is merely exemplary but not limiting; and, without departing from the spirit and scope of the present disclosure, a person of ordinary skill in the art may replace the arm-supporting assembly in FIGS. 1A, 1B and 1C with a chest-supporting assembly or may replace the chest-supporting assembly in FIGS. 1D and 1E with an arm-supporting assembly.

Figure 1D:
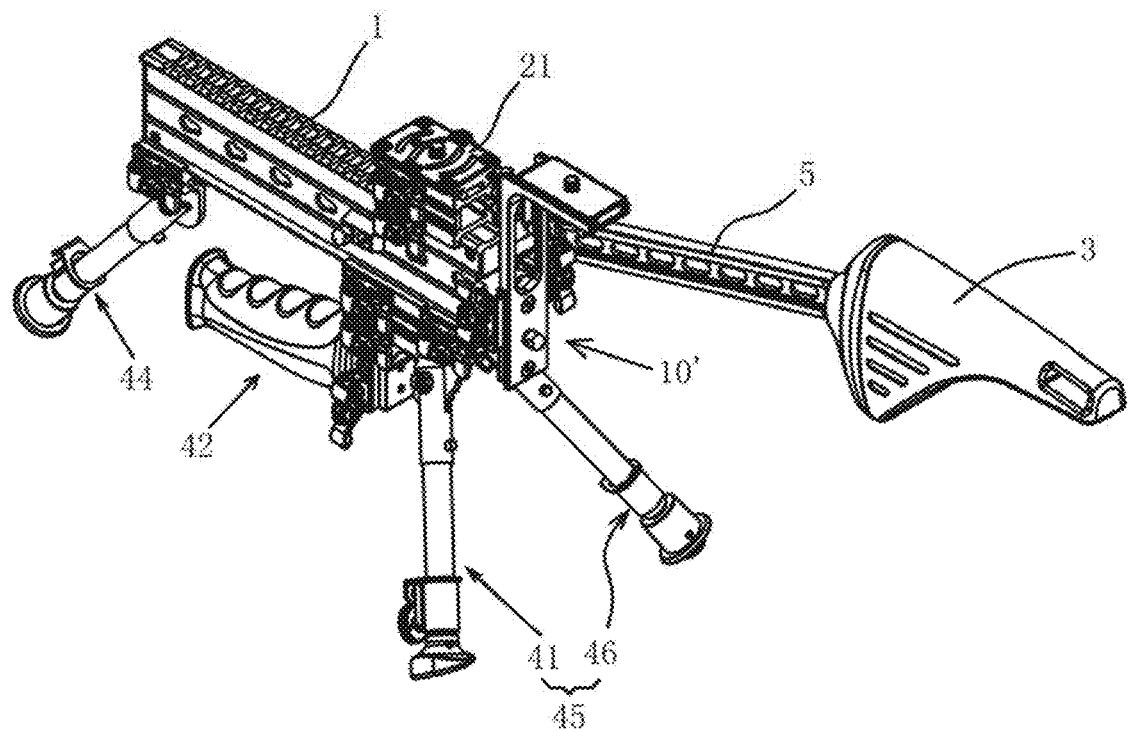
FIG. 1D shows a first example of a second embodiment of the shouldering type photographing support according to the present disclosure.
Figure 1E:
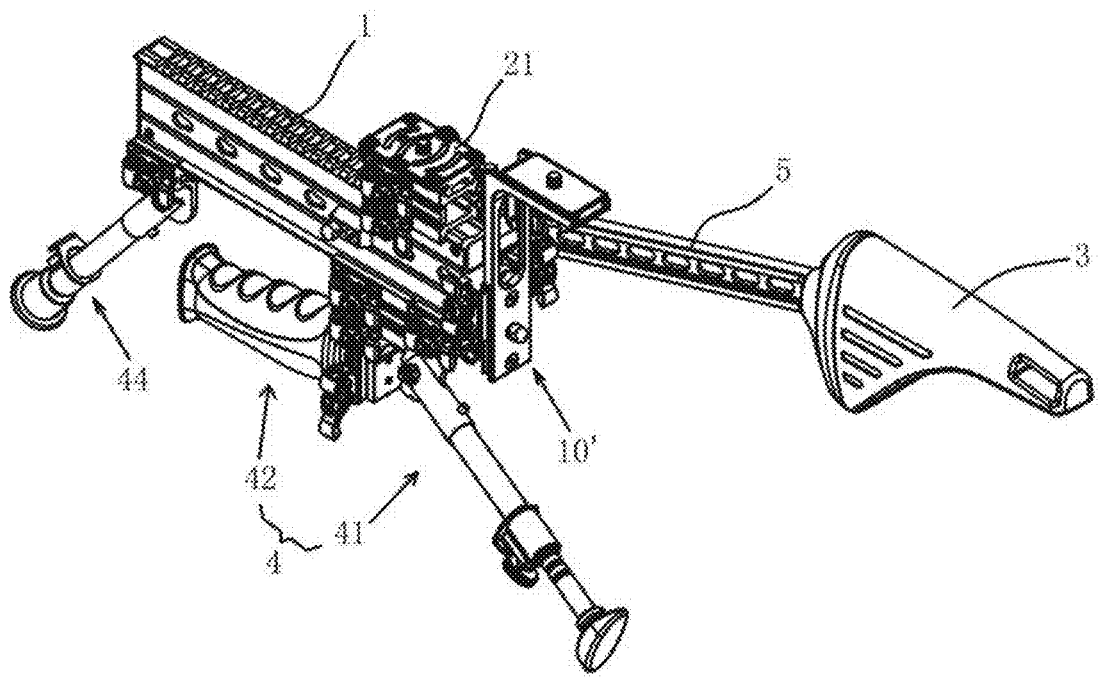
FIG. 1E shows a second example of the second embodiment of the shouldering type photographing support according to the present disclosure.
Figure 1F:
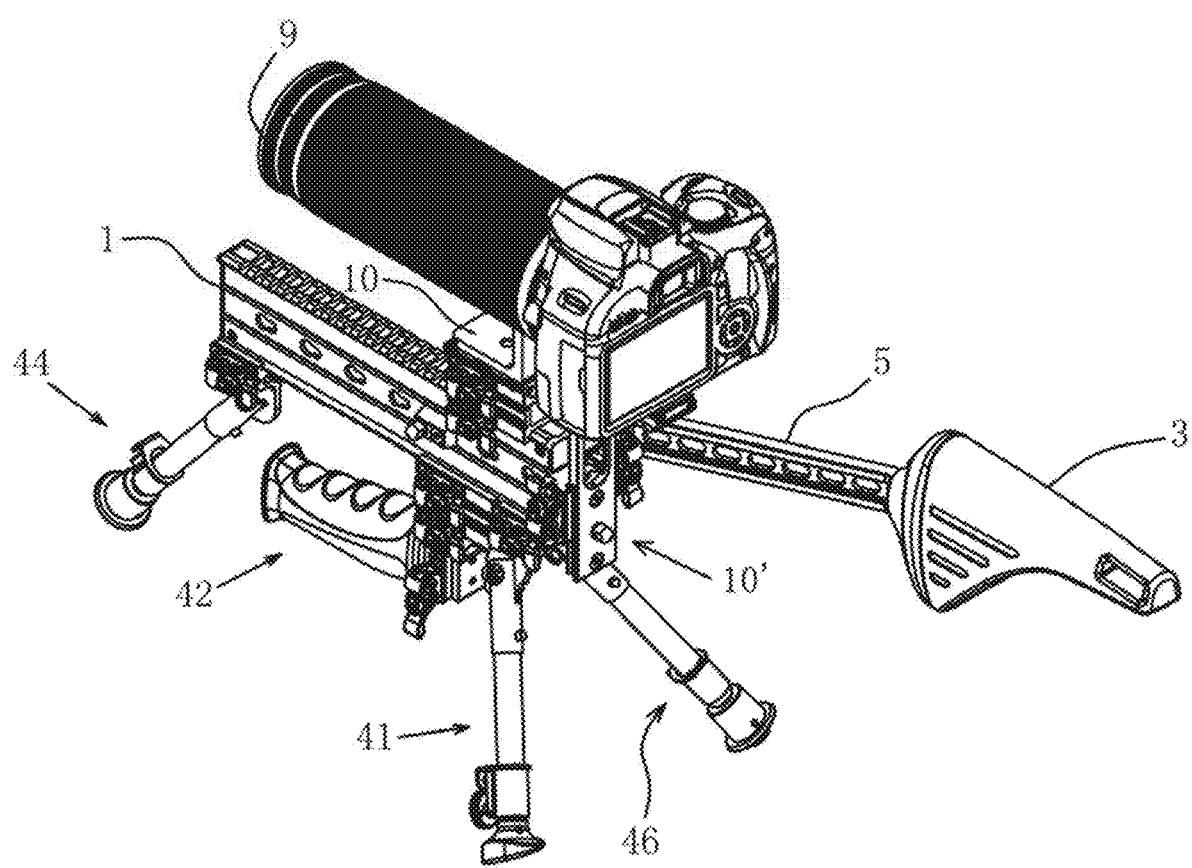
FIG. 1F shows the first example of the second embodiment of the shouldering type photographing support according to the present disclosure, wherein a camera and a lens are installed.
Figure 1G:
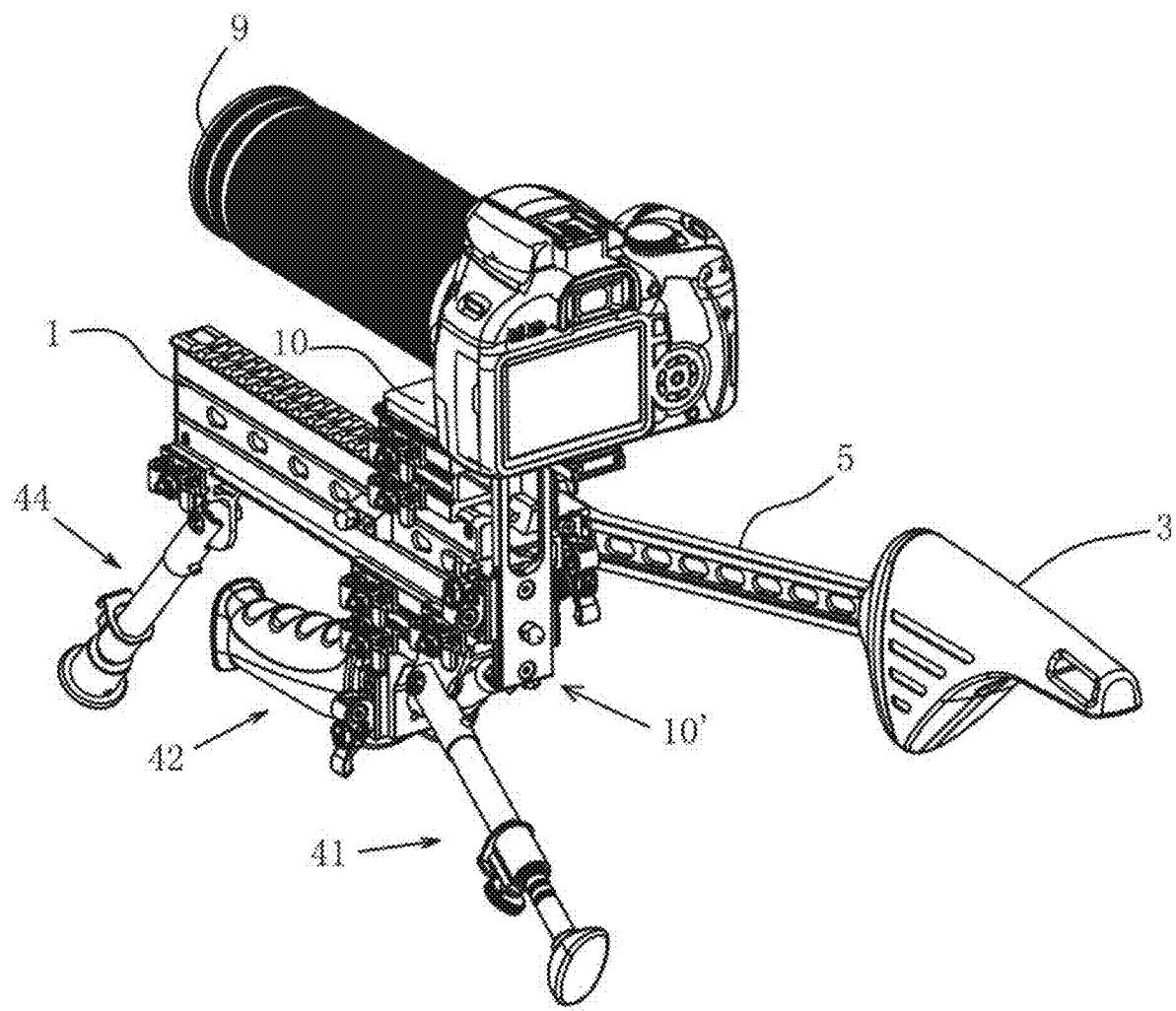
FIG. 1G shows the second example of the second embodiment of the shouldering type photographing support according to the present disclosure, wherein a camera and a lens are installed.
Figure 1H:
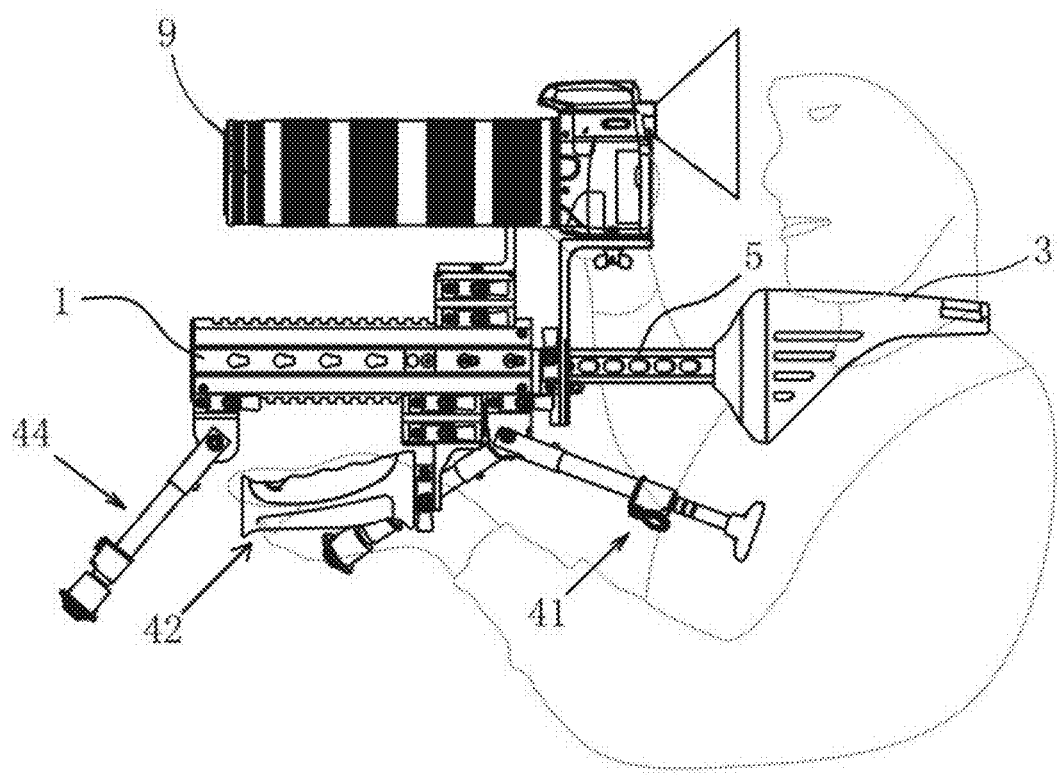
FIG. 1H shows the second example of the second embodiment of the shouldering type photographing support, in a shooting state, according to the present disclosure.
Figure 1I:
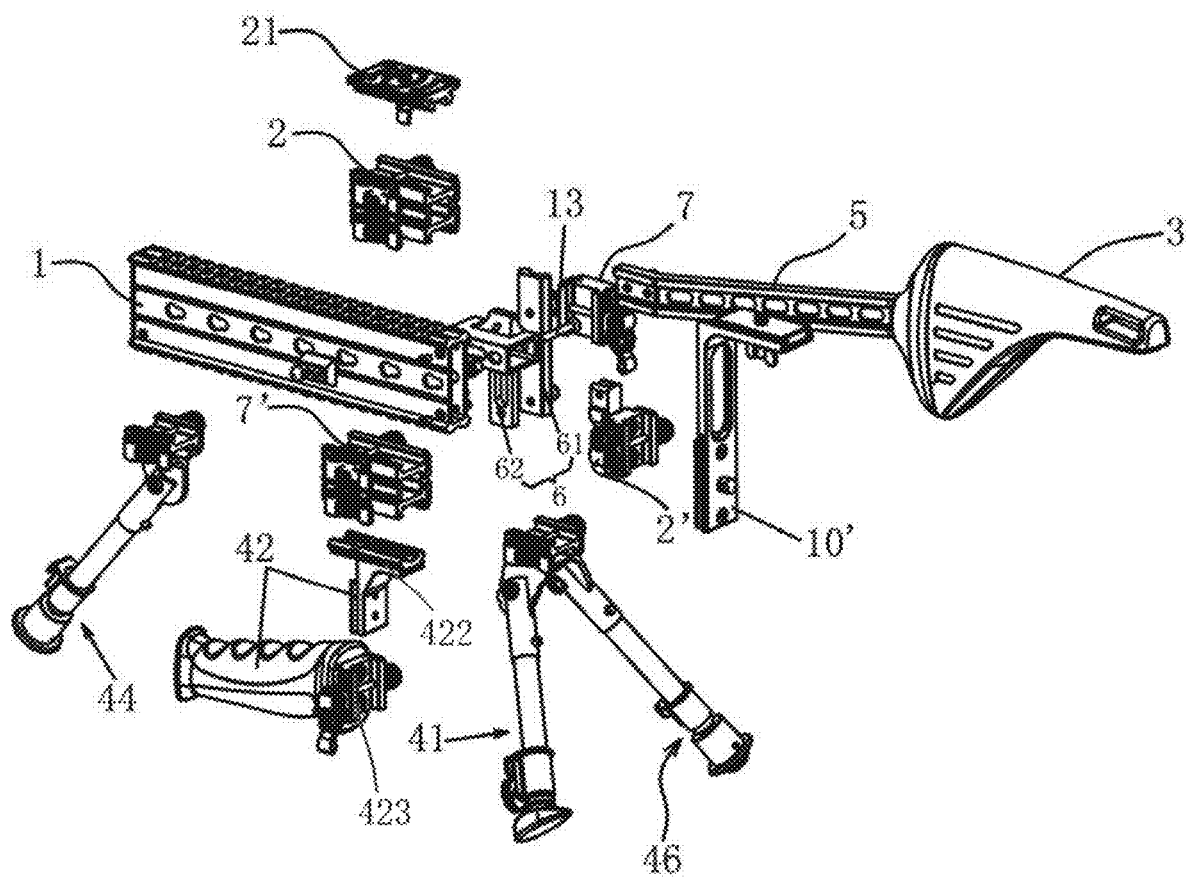
FIG. 1I is an exploded view of FIG. 1D.

In the examples shown in FIGS. 1D and 1E, additionally and advantageously, the shouldering type photographing support may further include an camera mounting support 10' for mounting a camera, which is arranged on one end of the main frame 1 rightly facing the photographer by a connecting base 2' (a locking device such as a single way quick locking device). By the camera mounting support 10', the distance between the eyes of the photographer and the camera may be further shortened. For example, as shown in FIGS. 1F, 1G and 1I, the camera is shown mounted on the camera mounting support 10', and the camera mounting support 10' can be a L-shaped mount as shown. Further, a camera lens can be supported and secured on the main frame 1, by a lens connecting base 2 installed on the main frame 1, and by a quick shoe plate provided on the lens connecting base 2. As shown in FIG. 1I, the lens connecting base 2 can be a dual-way quick locking device. The lens connecting base 2 can be adjusted and displaced axially along the main frame 1 according to the lens length.

Specifically, referring to FIG. 1H, the working principle is as follows. The shouldering assembly 3 is supported on the shoulder of the photographer, the arm-supporting assembly 41 is abutted against the left elbow joint of the photographer (or, when the chest-supporting assembly 41 is used, the chest-supporting assembly 41 is abutted against the left chest of the photographer). When the focusing and parameter adjusted need to be performed manually, since the load such as the photographic equipment can be supported by the arm-supporting assembly and/or the chest-supporting assembly 41, the photographer may vacate a hand to operate the manipulation keys on the length of the camera or the camera. When it is unnecessary to perform focusing and parameter adjustment, the photographer may hold the handheld assembly 42 by his/her left hand to better support the entire photographic equipment, and the photographer may hold the SLR camera by his/her right hand and operate the shutter of the SLR camera. Due to the presence of the arm-supporting assembly and/or the chest-supporting assembly 41, the shouldering assembly 3 and the handheld assembly 42, it is apparent that the requirements for the focusing, parameter adjustment and shutter operation can be better satisfied during the mobile shooting. Meanwhile, the entire photographic equipment is supported at least three points by the handheld assembly 42, the shouldering assembly 3 and the arm-supporting assembly and/or the chest-supporting assembly 41, so the supporting is more stable, it is more difficult to result in flutters during shooting, the stability of the camera during shooting is improved, it is advantageous for acquire better shot pictures, and the requirements for mobile shooting, angular shooting or other various shooting scenarios can be better satisfied.

As shown in FIG. 1D, when the photographer is tired in shooting, the photographic equipment can be placed on the ground to relieve the load of the photographic equipment on the photographer. In this case, a front supporting leg assembly 44 and a rear supporting assembly 45 may be mounted on the main frame 1 by a locking device such as a quick locking device. In some embodiments, the rear supporting assembly 45 consists of an arm-supporting assembly or a chest-supporting assembly 41 and a rear supporting leg assembly 46. When the photographer takes a rest, the rear supporting leg assembly 46 is unfolded, and the rear supporting leg assembly 46, the arm-supporting assembly or chest-supporting assembly 41 and the front supporting leg assembly 44 realize a three-point supporting or a tripod, so that the photographic equipment can be reliably supported on the ground. During shooting, the rear supporting leg assembly 46 can be retracted, as shown in FIGS. 1C and 1E. The front supporting leg assembly 44 is also quickly mounted on or dissembled from the main frame 1 by a locking device such as a quick locking device. During shooting, the front supporting leg assembly 44 can be disassembled. It is to be noted that, for clarity, the front supporting leg assembly 44 and some rear supporting assembly 45 are not shown in FIG. 2, but it should be understood that the front supporting leg assembly 44 and the rear supporting assembly 45 may be used in the embodiment shown in FIG. 2 by a person of ordinary skill in the art without departing from the spirit and scope of the present disclosure.

Now refer to FIG. 2, which shows the third embodiment. The working principle of the shouldering type photographing support of the present disclosure, when the supporting assembly 4 comprises an arm-supporting assembly or a chest-supporting assembly 41 and a single-legged cane assembly 43, will be described below. In some embodiments, the arm-supporting assembly or chest-supporting assembly 41 and the single-legged cane assembly 43 is connected to the main frame 1 by a locking device such as a quick locking device.

Considering the heavy weight of the camera assembly for a long-focus SLR camera, or considering a female photographer has no enough physical strength to support the heavy photographic equipment, the single-legged cane assembly 43 shown in FIG. 2 may be used. Specifically, the single-legged cane assembly 43 is supported on the ground, the arm-supporting assembly 41 is abutted against the elbow joint, and the shouldering assembly 3 is abutted against the shoulder. During horizontal shooting, the single-legged cane assembly 43 supports the main weight of the entire photographic equipment; and, during shooting at a low angle, the arm-supporting assembly 41 and the shouldering assembly 3 support and limit the photographic equipment, and the single-legged cane assembly 43 also supports the main weight of the entire photographic equipment. Accordingly, the load on the photographer is effectively reduced, and the fatigue of the photographer is relieved. The entire photographic equipment is supported at three points by the single-legged cane assembly 43, the shouldering assembly 3 and the arm-supporting assembly 41, so the supporting is more stable, it is more difficult to result in flutters during shooting, the stability of the camera during shooting is improved, it is advantageous for acquire better shot pictures, and the requirements for mobile shooting, angular shooting or other various shooting scenarios can be better satisfied. Although the arm-supporting assembly is used in FIG. 2, it is merely exemplarily but not limiting; and, without departing from the spirit and scope of the present disclosure, a person of ordinary skill in the art may replace the arm-supporting assembly in FIG. 2 with a chest-supporting assembly.

Now refer to FIG. 2A-2C which shows the fourth embodiment, it's an alternative design based on the second embodiment, wherein a single arm-supporting assembly or a chest-supporting assembly 41 is replaced with a combined supporting assembly 45, and the handheld assembly beneath the main frame 1 is replaced with a cane assembly, the combined supporting assembly 45 comprises a chest-supporting assembly, an arm-supporting assembly and supporting leg assembly. According to the need, a handheld assembly can be also installed perpendicularly on a side of the main frame 1, thus providing an additional supporting point. The detailed structure of the combined supporting assembly 45 will explained hereafter.

Now refer to FIG. 3-3B which shows the fifth embodiment, it's an alternative design based on the fourth embodiment, wherein the cane assembly is replaced with a handheld assembly. As shown in FIG. 3, the handheld assembly is provided with a handgrip 421, all of sides of the handgrip 421 are curved surfaces; the handgrip 421 is provided with a connecting device 423, for connecting to the main frame 1 via a connecting support 422 and connecting base 7'; the handgrip 421 can be vertically connected to a side of the main frame 1, or be connected beneath the main frame 1 and axially parallel with the main frame 1 as shown; an axial connecting position of the handheld assembly along the main frame 1 can be adjusted, such that the holding distance of the handgrip 421 can be adjusted.

As shown in FIG. 3B, the photographer may hold the handheld assembly 42 by his/her left hand, the left elbow joint grips the arm-supporting assembly in the rear supporting assembly 45, the left chest abuts against the chest-supporting assembly, and the shoulder supports the shouldering assembly 3, so that a stable three dimensional four-point supporting to the camera is realized. In this case, the photographer still can vacate a hand to operate the camera.

Now refer to FIG. 4-6, the specific structure of the shouldering assembly 3 will be described below.

As shown and described above, the shouldering assembly 3 is rest on and abutted against the shoulder of the photographer, comprising: a shouldering member 33, a shouldering supporting arm 5, connecting components for shouldering member and shouldering supporting arm 34, 35, 36 and shouldering supporting arm connecting base assembly 6, 7.

Figure 5:
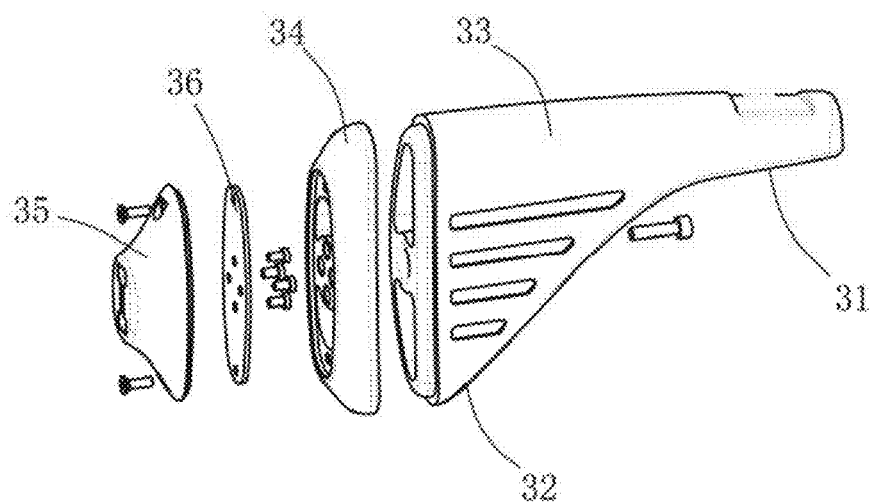
FIG. 5 is an exploded view of the shouldering assembly according to the present disclosure.
Figure 5A:
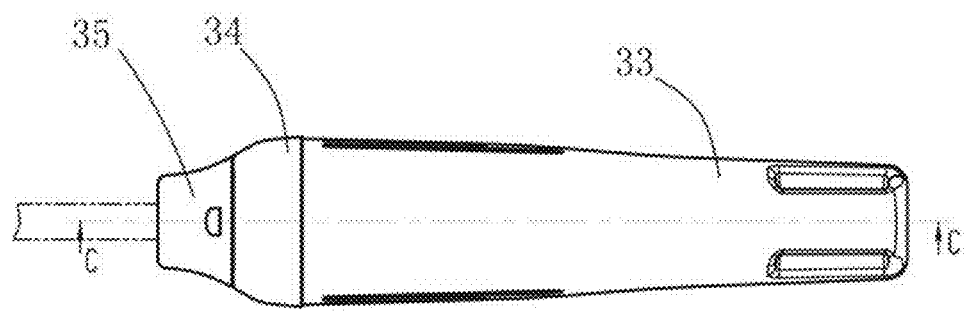
FIG. 5A is a top view of the shouldering assembly according to the present disclosure.
Figure 5B:
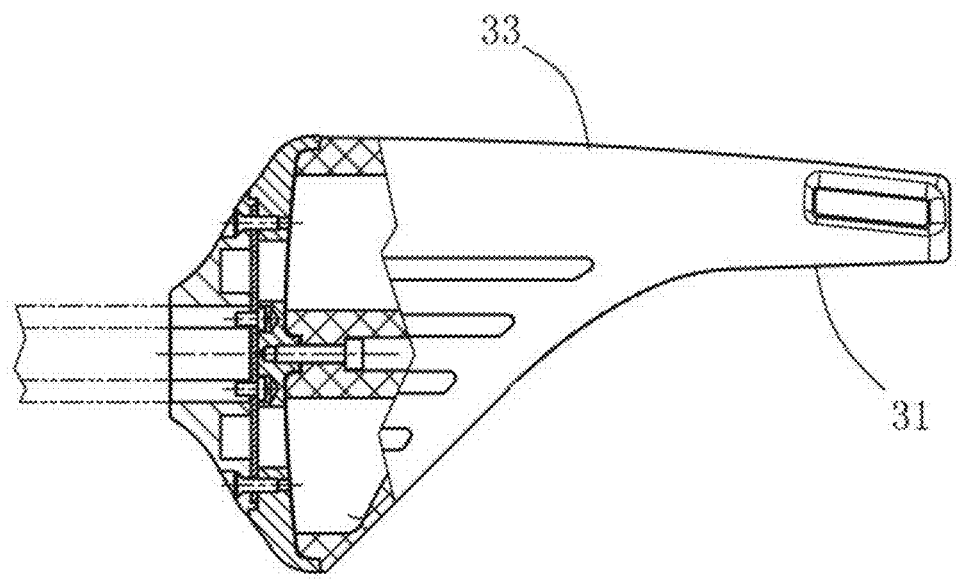
FIG. 5B is a partially sectional view of FIG. 5A taken along C-C.

Now refer to FIG. 5-5B for more detailed structure, in some embodiments, the shouldering assembly 3 includes a bearing part 31 touching or abutted against an upper-shoulder of the human body and a recoil bearing part 32 designed according to ergonomics and touching or abutted against a location between the upper-shoulder and chest. The upper-shoulder and the location between the upper-shoulder and chest respectively can be refer to an upper part of the shoulder in a height direction and a part of the shoulder in front of the face when the photographer photographs. The positioning of the shouldering member 33 in both locations (upper-shoulder and location between the upper-shoulder and chest) can be realized by coordinating the two bearing parts. This is conductive to firmly and reliably supporting and fixing the shouldering assembly 3 on the shoulder of the human body, so that the entire photographic equipment can be stably supported and is not easy to slide down no manner what posture the photographer takes when shooting pictures, for example, shooting at a low angle, at a high angle, etc.

In some embodiments, the outer surfaces of the bearing part 31 and the recoil bearing part 32 form an arc-shaped outline fitted with the surface of the shoulder of the human body. Such outline is more comfortable and convenient in use and will not cause tenderness or other uncomfortable feelings on the shoulder.

In some embodiments, for ease of connection and to ensure the strength demand, specifically referring to FIG. 5, the shouldering assembly 3 includes a shouldering member 33, a shouldering mount 34, a shouldering front cover 35, and a connecting flange 36 connecting the shouldering front cover 35 to the shouldering mount 34, adjacent two of which are fixedly connected via bolts. The shouldering member 33 is a rubber base made of elastic material such as rubber plastic, so that the comfort can be improved when the shouldering member 33 is abutted against the shoulder. The shouldering mount 34 is used for connecting the shouldering supporting arm 5 described hereinafter.

With reference to FIGS. 4-4A and FIGS. 5-5B, in some embodiments, the shouldering assembly 3 is fixedly connected to the main frame 1 via a shouldering supporting arm 5.

Figure 6:
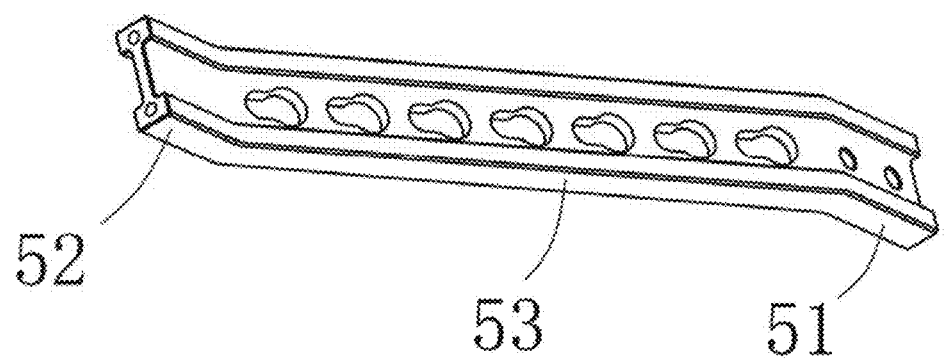
FIG. 6 is a perspective view of a shouldering supporting arm according to the present disclosure.

FIG. 6 shows a detailed structure of the shouldering supporting arm 5, which includes a first connection segment 51 that is connected to the main frame 1 and extends in a longitudinal direction, a second connection segment 52 that is connected to the shouldering assembly 3 and extends in a longitudinal direction, and a middle section 53 that connects the first connection segment 51 to the second connection segment 52. Here, the longitudinal direction refers to a direction of extension along the length of the main frame 1. Wherein the first connection segment locates at one end of the shouldering supporting arm 5 and is provided with a connecting section or connecting device; the second connection segment locates at the other end of the shouldering supporting arm 5. The middle section 53 extends to the right rear relative to the main frame 1, optionally obliquely extends to the right rear. Of course, this structure is only one solution of the transverse offset arrangement of the shouldering assembly 3. This solution is simple and beautiful in structure, the cross-section is an I-shaped section, the weight is light and the structure is firm and durable. The transverse offset arrangement may also have other alternative solutions. For example, two perpendicular rods are provided to realize the transverse offset of the shouldering assembly 3 from the main frame 1. In some embodiments, the first connection segment 51 and the second connection segment 52 are fixed on the main frame 1 and the shouldering assembly 3 via bolts. As shown in FIG. 6, the first connection segment, second connection segment and middle section are not in a same axis. However, it should be noted that alternatively they can be on a same axis.

Figure 4:
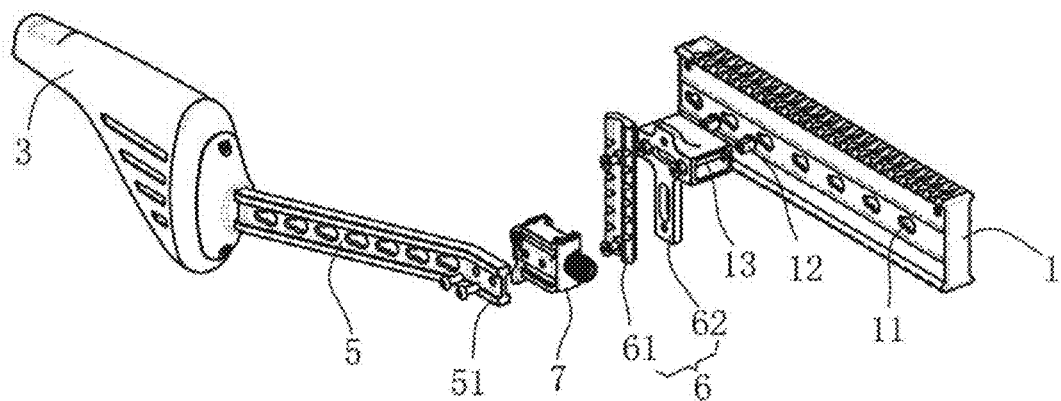
FIG. 4 is an exploded view of assembling the shouldering assembly on the main frame according to the present disclosure.
Figure 4A:
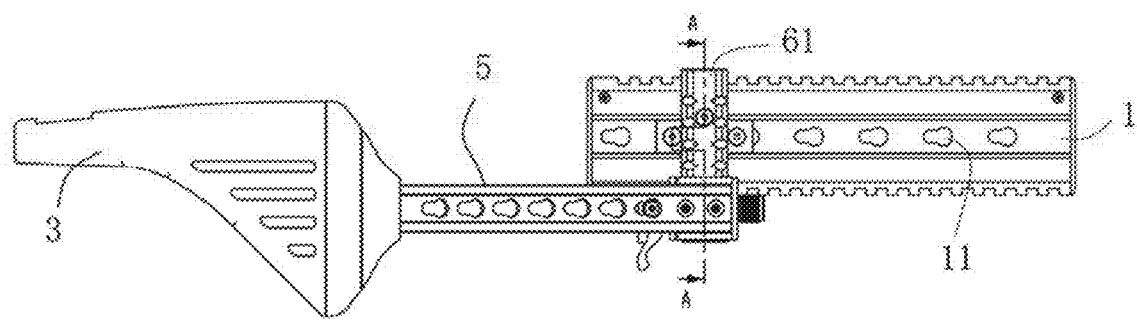
FIG. 4A is a principal projection view of connecting the shouldering assembly to the main frame according to the present disclosure.
Figure 4B:
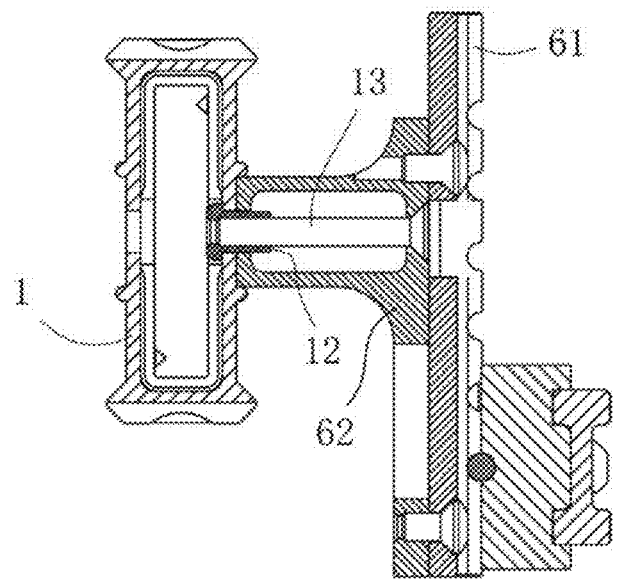
FIG. 4B is a sectional view of FIG. 4A taken along A-A, showing the shouldering supporting arm connecting base assembly.

As shown in FIGS. 4-5B, for ease of connection and installation, in some embodiment, the shouldering assembly 3 comprises a shouldering member 33, a shouldering supporting arm 5, connecting components for shouldering member and shouldering supporting arm 34, 35, 36 and shouldering supporting arm connecting base assembly 6, 7. The shouldering supporting arm connecting base assembly 6, 7 is provided with a connecting section or connecting device 6 connecting with the connecting section or connecting device of the shouldering supporting arm 5, and the connecting base assembly 6, 7 is connected to a side of the main frame 1. Considering different users and different usage requirements, the distance between the shouldering assembly 3 and the main frame 1 is required differently. Therefore, in some embodiments, a Picatinny rail or a trapezoidal rail extending vertically is provided on the connecting device 6. In some embodiments, the connecting device 6 consists of a vertical skeleton 61 and a cross-shaped fixed base 62. The vertical skeleton 61 may be connected to the cross-shaped fixed base 62 via a screw. The Picatinny rail or the trapezoidal rail is directly formed on the vertical skeleton 61. Specifically, the first connection segment can be fastened on a locking device such as quick locking device 7, such that the shouldering supporting arm 5 can be locked on the Picatinny rail or trapezoidal rail via the quick locking device 7. The quick locking device is as described in another U.S. patent application Ser. No. 15/957,334 by the applicant, which is incorporated herein by reference in its entirety. The vertical position of the shouldering assembly 3 is adjusted by different locking positions of the quick locking device 7 on the rail, so that the usage requirements are better satisfied.

Figure 4C:
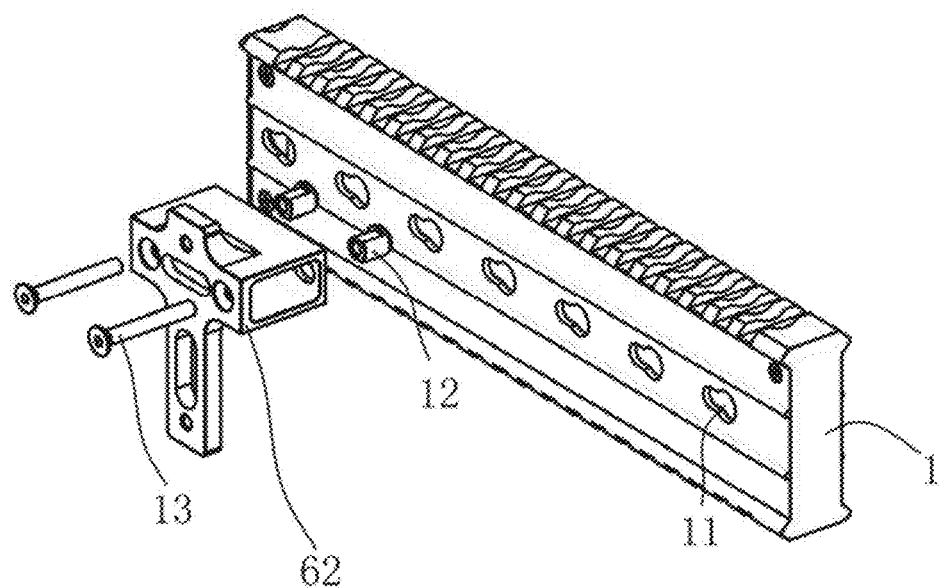
FIG. 4C is an exploded view of assembling a connecting device of the shouldering supporting arm connecting base assembly on the main frame according to the present disclosure.
Figure 4D:
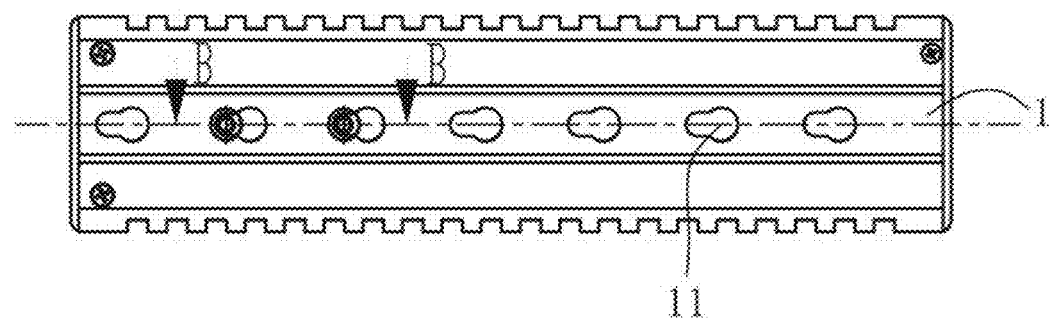
FIG. 4D is a side view of assembling the connecting device of the shouldering supporting arm connecting base assembly on the main frame according to the present disclosure, wherein the connecting device is removed for clarity.
Figure 4E:
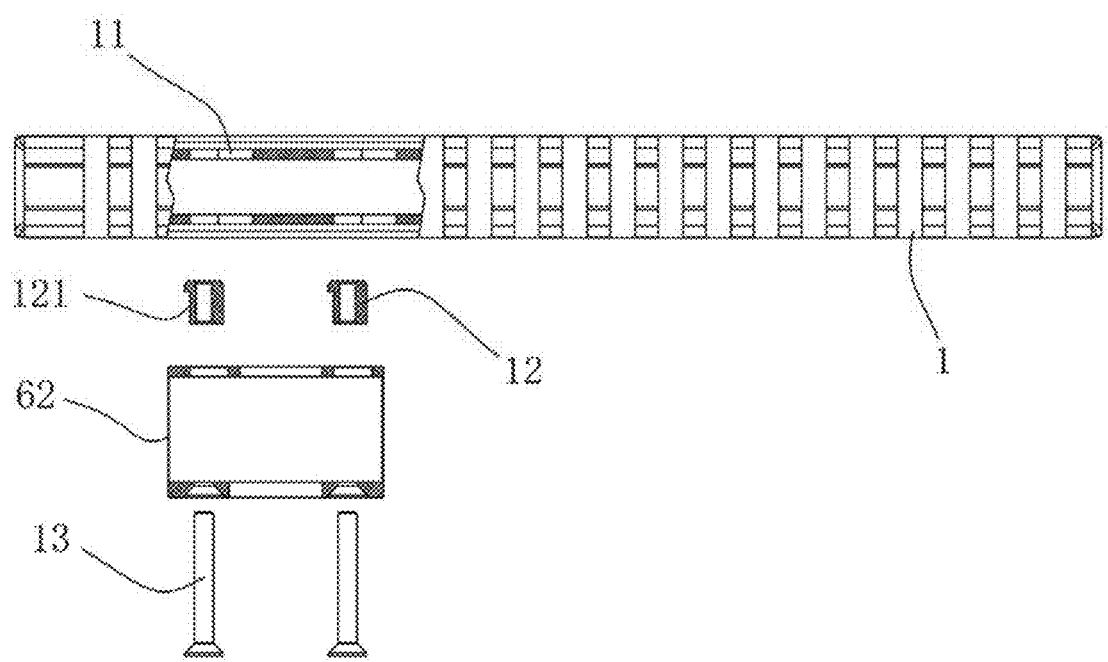
FIG. 4E is a partially sectional view of FIG. 4D taken along B-B.

In some embodiments, the shouldering assembly may be designed as being adjusted longitudinally. Specifically, referring to FIGS. 4-4E, several mounting holes 11 distributed longitudinally are formed on the main frame 1; a shoulder nut 12 for fixing the connecting device 6 and a screw 13 fitted with the shoulder nut 12 are provided on the connecting device 6; and, the connecting device 6 is locked and fixed in any one of the mounting holes 11 via the screw 13 and the shoulder nut 12. In some embodiments, the mounting holes 11 are gourd-shaped holes. The diameter of one end of the shoulder nut 12 fitted with the mounting hole 11 is greater than the smaller diameter of the gourd shape and less than the larger diameter of the gourd shape. When in use, the bolt may be extended into the mounting hole 11 from a position having the larger diameter and then fixed at a position having the smaller diameter, so that the fixation is firm and it is convenient for disassembly. In some embodiments, referring to FIGS. 4C-4E, there is at least one plane 121 on the shoulder nut 12. The plane 121 extends from an end of the shoulder nut 12 close to the connecting device 6 in an axial direction. The length of the plane 12 is less than the axial length of the shoulder nut, so that a limiting piece is formed at an end of the shoulder nut 12 away from the connecting device 6 and at the tail end of the plane 121, and the shoulder nut 12 is limited in the mounting hole 11 by the limiting piece. The shoulder nut 12, the screw 13 and the connector 16 form an assembly. When the connecting device 6 is to be mounted in the mounting hole 11, the shoulder nut 12 is aligned with the large-diameter position of the gourd-shaped mounting hole 11 and pushed, the shoulder nut 12 is then horizontally moved to the small-diameter position of the mounting hole, and the screw and the shoulder nut 12 are locked. Therefore, it is convenient and fast, and the connection is reliable. By fitting the connecting device 6 within the mounting holes 11 at different positions on the main frame 1, different mounting positions of the connecting device 6 on the main frame 1 can be realized, and the position of the shouldering assembly 3 in the longitudinal direction can be adjusted according to the usage requirements.

Figure 7:
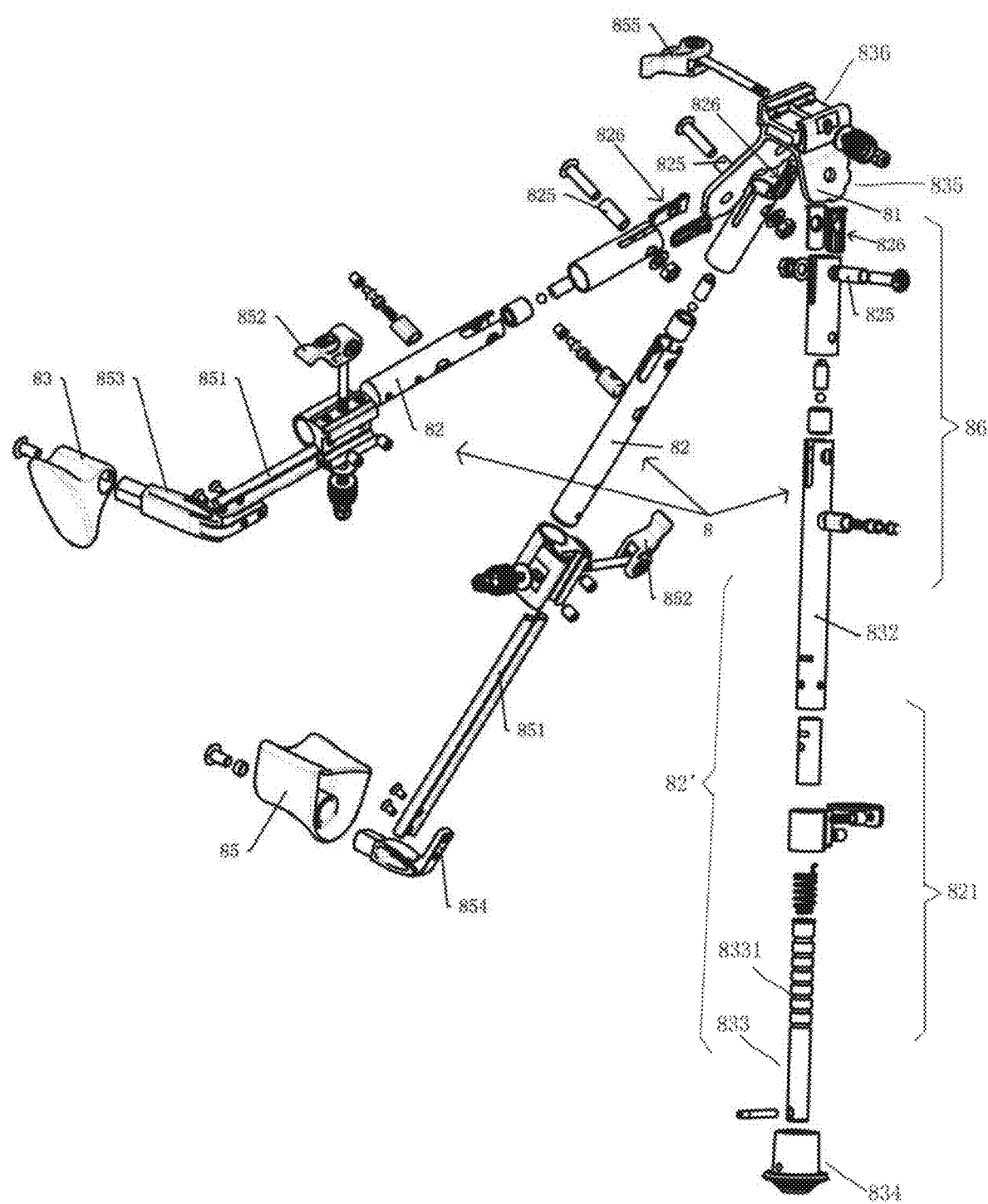
FIG. 7 is an exploded assembly diagram of a combined supporting assembly consisted of a chest-supporting assembly, arm-supporting assembly and supporting leg assembly from the fourth, fifth embodiment according to the present disclosure.
Figure 7A:
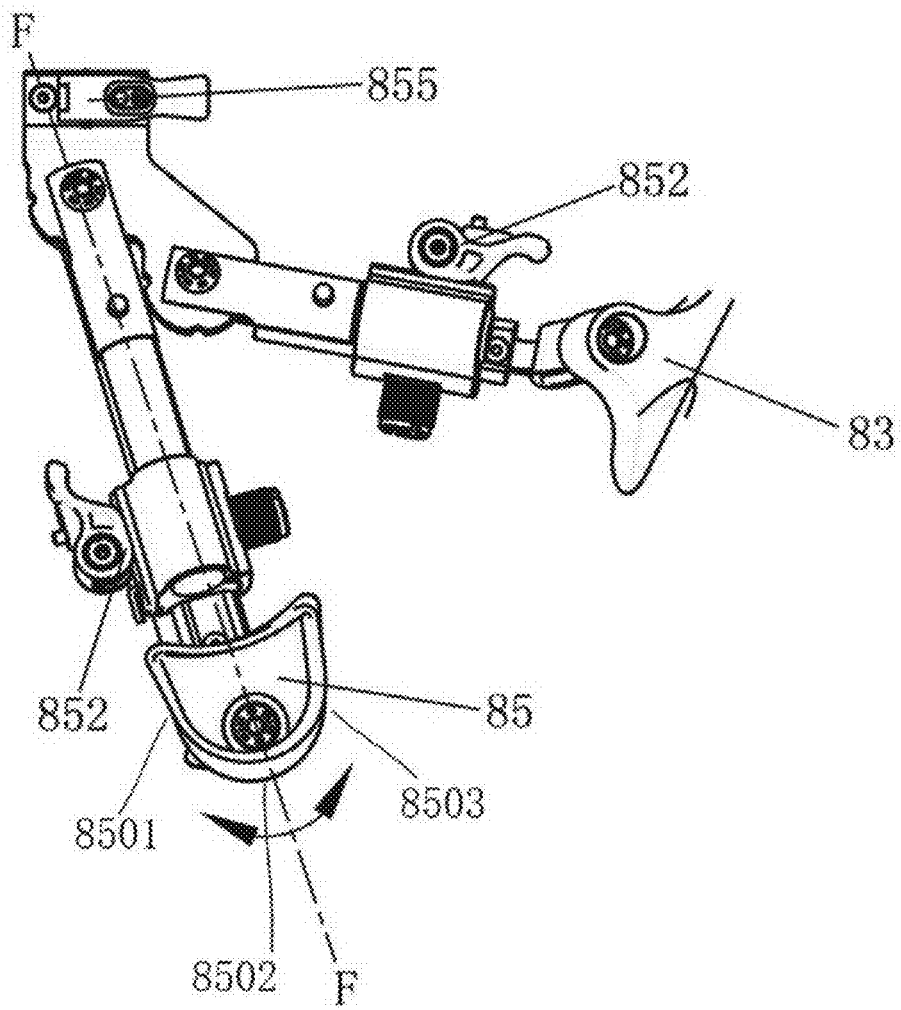
FIG. 7A is a lateral view of the part of the supporting assembly of FIG. 7.
Figure 7B:
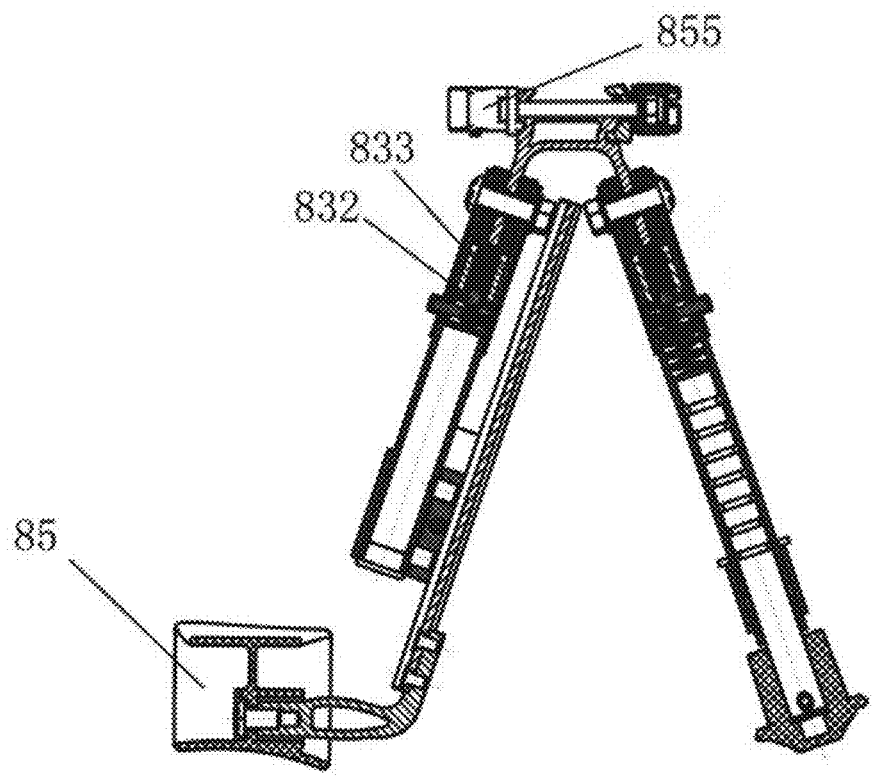
FIG. 7B is a sectional view of FIG. 7A taken along F-F.
Figure 7C:
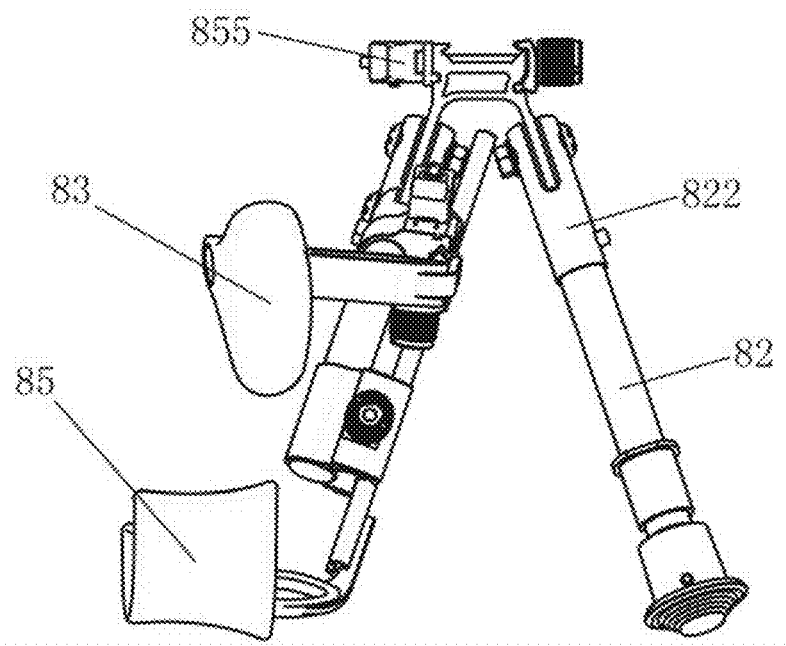
FIG. 7C is a front view of the part of the supporting assembly of FIG. 7.
Figure 7D:
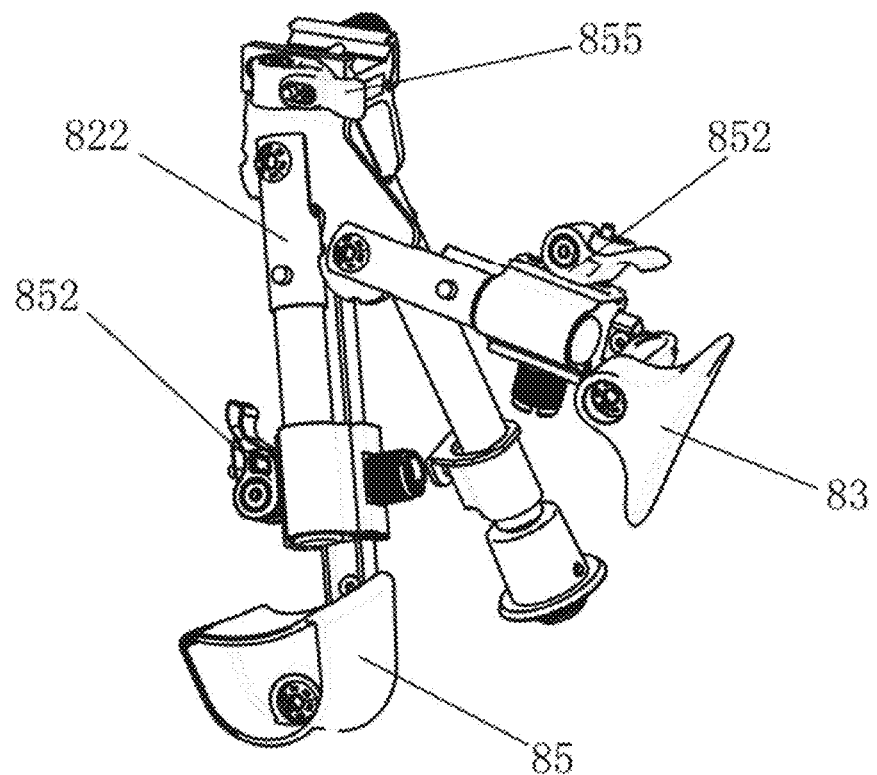
FIG. 7D is a perspective view of the part of the supporting assembly of FIG. 7.
Figure 7E:
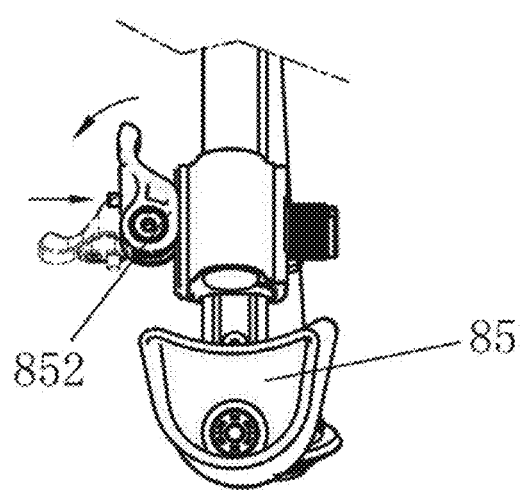
FIG. 7E is a side view of an arm-supporting member of the arm-supporting assembly of FIG. 7.

The rear combined supporting assembly 45 of the present disclosure will be described below with reference to FIGS. 7-7I. The rear combined supporting assembly 45 is connected to the main stand 1 by a connecting device 836 which can be a quick locking device with a locking element 855. The rear combined supporting assembly 45 includes a three-legged assembly 8, which corresponds respectively to the chest-supporting assembly, arm-supporting assembly, supporting leg assembly, with one end connected to a rotary positioning member 81 while the other end respectively connected to a chest-supporting member 83, an arm-supporting member 85 and the like. A damping member 826 is further provided on the positioning and locking structure 86 mainly consisting of elements 81, 82, so that the sway of the rotary member 82 in an axial direction of the shaft 825 can be reduced during the rotation and positioning of the rotary member 82, and the stability between the rotary positioning member 81 and the rotary member 82 is ensured. As shown in FIGS. 7 and 7C, the rotary member 82 can be a fixed supporting arm 82 or supporting arm assembly 82'. The positioning and locking mechanism is as described in another U.S. patent application Ser. No. 16/144,091 by the applicant, which is incorporated herein by reference in its entirety.

Specifically, referring to FIGS. 7, 7A, 7B, 7C, 7D, 7E, 7F, 7G and 7H, the combined supporting assembly 45 comprises a chest-supporting assembly, arm-supporting assembly, supporting leg assembly.

The chest-supporting assembly is provided with a rotatable chest-supporting member 83 adapted with a chest surface, adjustable supporting arm and a fixed supporting arm; the adjustable supporting arm is respectively connected with the fixed supporting arm and chest-supporting member 83, wherein the chest-supporting member 83 is connected with the adjustable supporting arm or with a tie-beam of the adjustable supporting arm; the adjustable supporting arm can be connected with a connecting device provided on the fixed supporting arm, and adjusted to a certain length of use; the chest-supporting assembly can be connected with the main frame 1 via a connecting device 836 on a fixed supporting arm seat 835.

Figure 7F:
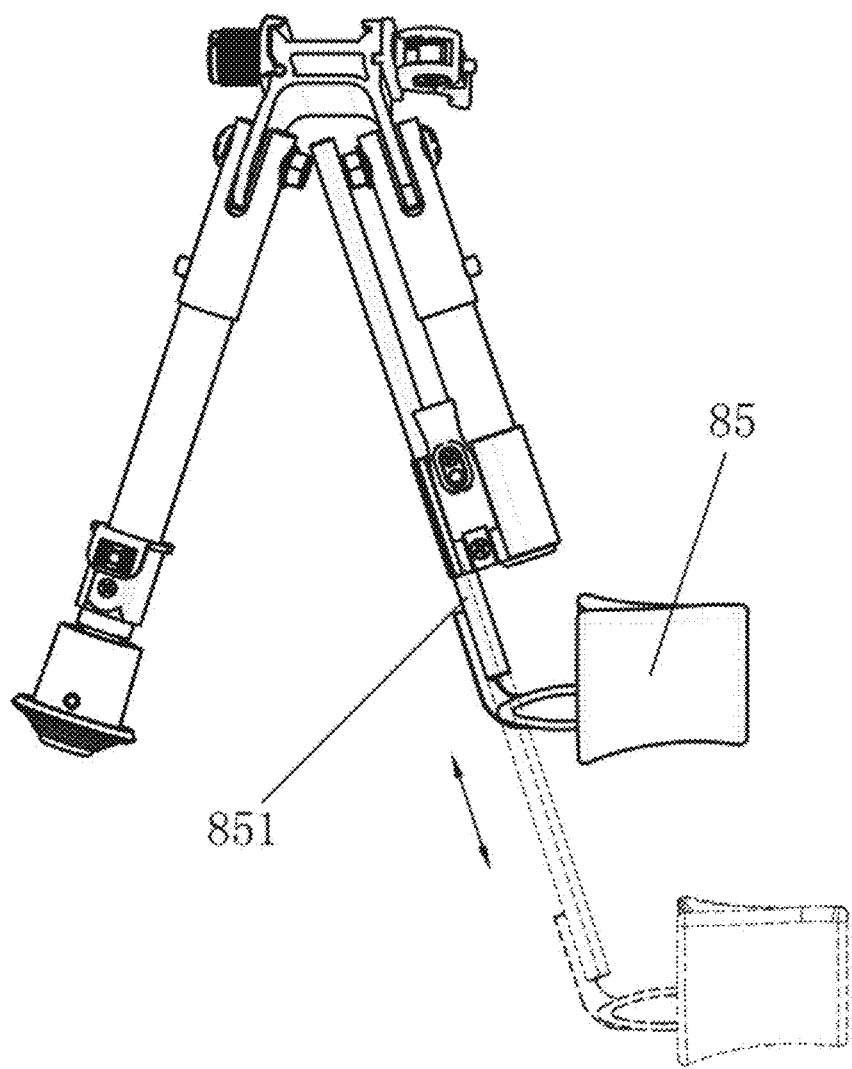
FIG. 7F is a telescopic diagram showing the arm-supporting member of the arm-supporting assembly of FIG. 7.
Figure 7G:
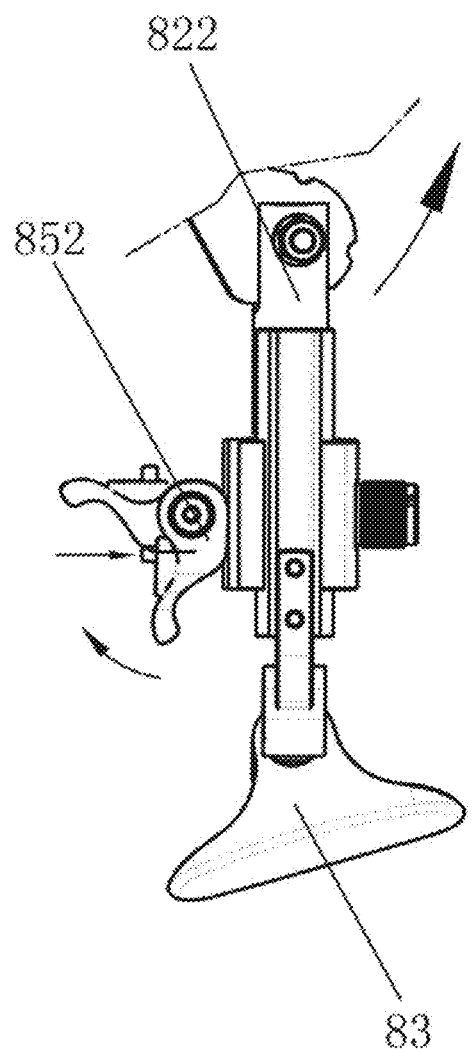
FIG. 7G is a side view of an chest-supporting member of the chest-supporting assembly of FIG. 7.
Figure 7H:
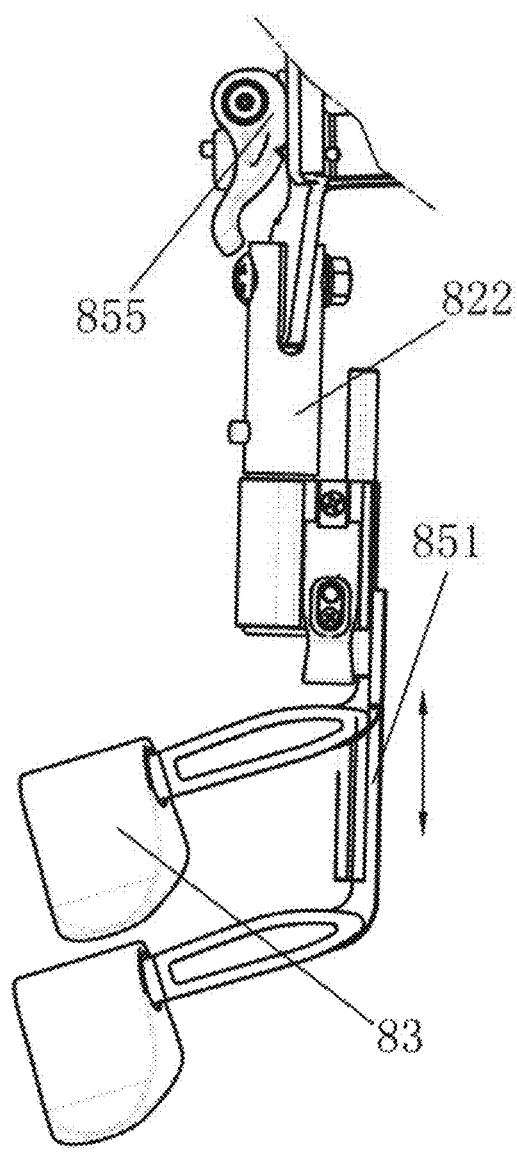
FIG. 7H is a telescopic diagram showing the chest-supporting member of the chest-supporting assembly of FIG. 7.

The chest-supporting member 83 is connected to a adjustable supporting arm 851, 853, the arm-supporting member 85 is connected to another adjustable supporting arm 851, 854 of the arm-supporting assembly, and the adjustable supporting arm 851, 853 and 851, 854 is slidingly connected to a adjustable supporting arm locking assembly 852 and can be locked by the adjustable supporting arm locking assembly 852. The tie-beam 853 can be designed as a L shaped leg connected to the adjustable supporting arm. As shown in FIGS. 7F and 7H, the adjustable supporting arm 851 can drive the chest-supporting member 83 or the arm-supporting member 85 to do a telescopic movement along the rail, so that the requirements for adjusting the shooting angle and posture by the photographer are satisfied.

The arm-supporting assembly is provided with an arm-supporting member, an adjustable supporting arm and a fixed supporting arm; the adjustable supporting arm comprises an adjustable guide rail and a transverse shaft; the arm-supporting member has a first supporting face 8501 bearing an inner side of an elbow joint towards to a forearm, a second supporting face 8502 bearing a pivot of the elbow joint, and a third supporting face 8503 bearing an inner side of the elbow joint towards a upper arm; wherein the first, second and third supporting face 8501, 8502, 8503 of the arm-supporting member is designed according to ergonomics so as to adapted with a surface of an inner side of the elbow joint; the arm-supporting member is rotatably connected with the transverse shaft of the adjustable supporting arm, such that the arm-supporting member can be adjusted to a certain length of use; the arm-supporting assembly can be connected to the installation surface of the main frame 1 via a connecting device 836 provided on the fixed supporting arm seat 835, wherein the arm-supporting assembly and chest-supporting assembly are on a same side of the main frame 1.

The supporting leg assembly is provided with a supporting arm assembly, the supporting arm assembly is consisted of an outer supporting arm 832 and an inner supporting arm 833; the outer supporting arm 832 is designed as a tubular shape, one end of which is connected with a supporting arm seat 835, the other end is provided with a telescoping adjustable fastening device 821; the inner supporting arm 833 is designed as a cylinder; the cylinder surface can be provided with annular slots 8331 for adjusting and locking a axial position of the inner supporting arm 833 relative to the outer supporting arm 832. The inner supporting arm 833 is arranged inside the outer supporting arm 832, a supporting height of the supporting leg assembly can be adjusted by the fastening device; one end of the inner supporting arm 833 is provided with a foot pad; the supporting leg assembly comprises a front supporting leg assembly and a rear supporting leg assembly, wherein each of the front supporting leg assembly and rear supporting leg assembly is provided with a single or a pair of supporting arm assembly.

Figure 7I:
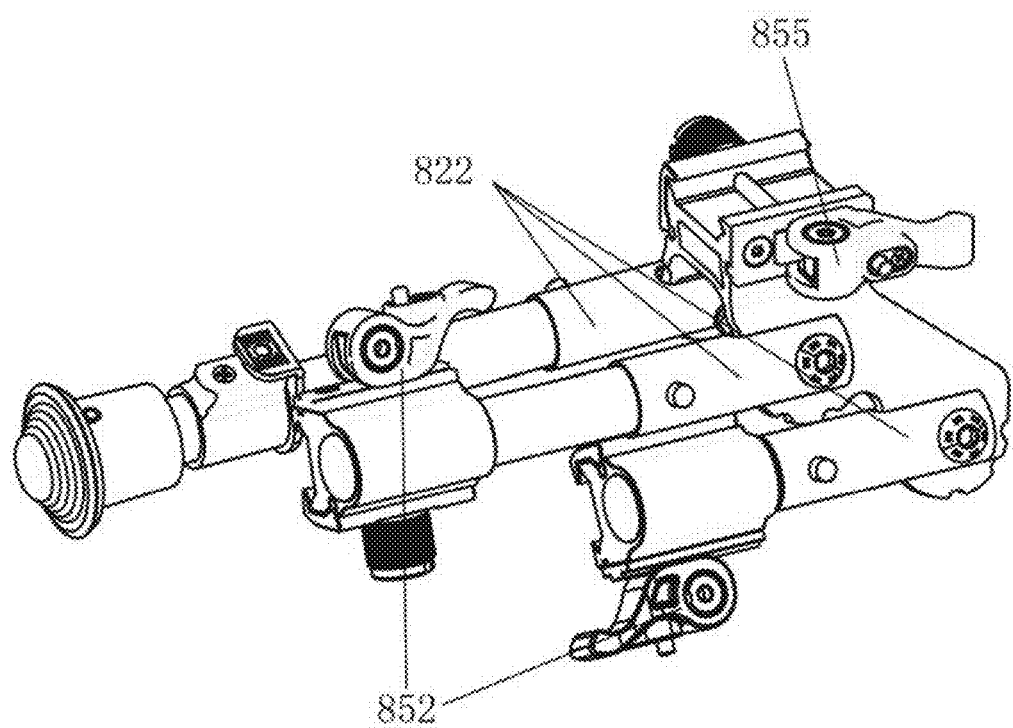
FIG. 7I shows the part of the supporting assembly of FIG. 7 in a folded state, wherein the arm-supporting member and the chest-supporting member are disassembled.

FIG. 7I shows a schematic diagram of folding the rear combined supporting assembly 45 after the arm-supporting member 85 and the chest-supporting member 83 are disassembled. The folded rear combined supporting assembly 45 occupies a small space and may be stored and carried conveniently.

It is to be noted that, the adjustable supporting arm locking assembly 852 and the main frame locking assembly 855 can be quick locking devices.

Figure 8:
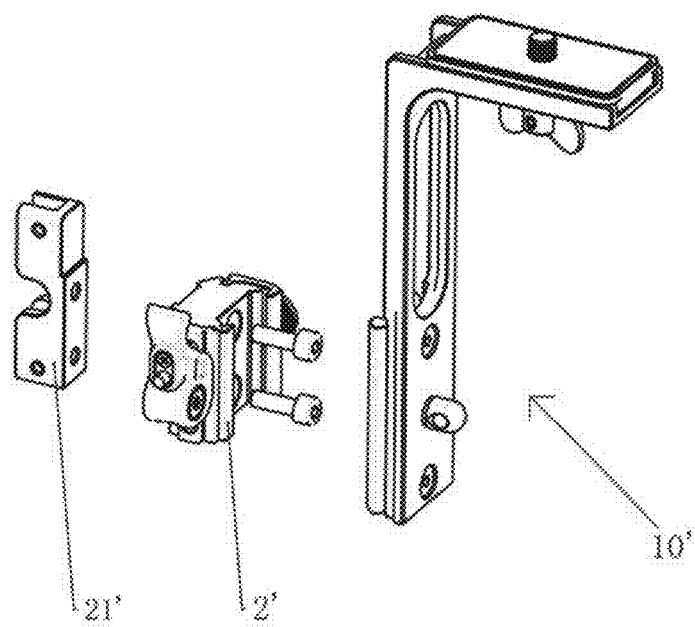
FIG. 8 is a schematic structural diagram showing the camera mounting support, the camera connecting base, a connecting block connected to one end of the main frame, from the second to fifth embodiment according to the present disclosure.
Figure 8A:
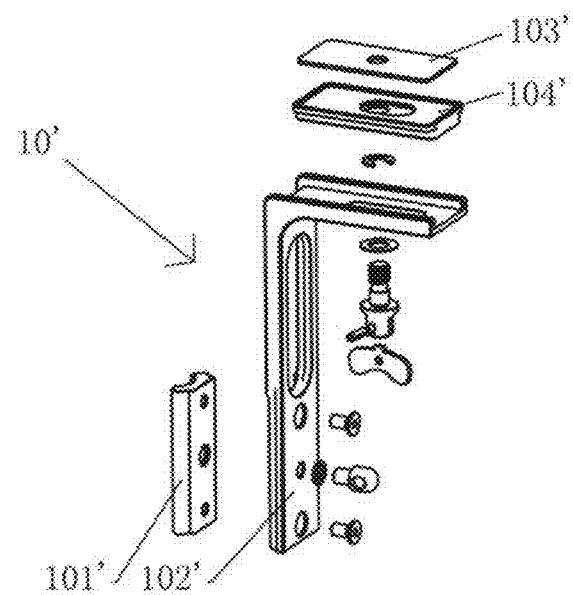
FIG. 8A is an exploded structure diagram of the camera mounting support of FIG. 8.
Figure 8B:
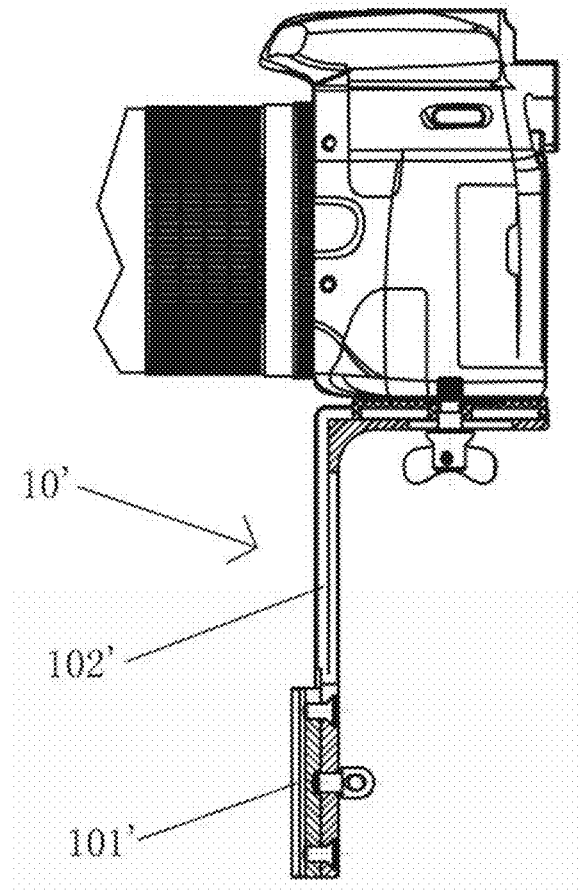
FIG. 8B is a partial sectional view after a camera is mounted on the camera mounting support of FIG. 8.

The camera mounting support will be further described with reference to FIGS. 8-8B. As shown in FIGS. 8, 8A and 8B, the camera mounting support 10' is connected to the connecting base 2'; and, on the other side of the connecting base 2', the connecting base 2' is connected to the main frame 12 by a connecting block 21', wherein the connecting block 21' can be designed with a U-shaped recess on a side facing the main frame 1 as shown. The camera mounting support 10' includes a support body 102', and an support rail 101' connected to the support body 102' via fasteners, a camera base rubber cushion 103' and a rubber cushion slider 104' both connected to the support body 102', wherein the rubber cushion slider 104' can be a quick shoe plate and may slide on the support body 102' and fixed relative to each other. Therefore, when a camera is mounted on the camera base rubber cushion 103', the position of the camera in the horizontal direction of the camera mounting support 10' can be adjusted according to the requirements for focusing, parameter adjustment and shutter operation.

Wherein a lens mount 10 is connected to the lens connecting base via a quick shoe plate 21 provided on a upper part of the lens connecting base, a lower part of the lens connecting base is connected on top the main frame 1; the lens connecting base can be axially displaced along the main frame 1 according to a length of the lens.

Wherein the camera mounting support is locked to the camera connecting base via the support rail, and the camera connecting base is provided and mounted on the rear end of the main frame 1 via the connecting block. The camera can be connected to the camera connecting base via the camera mounting support, wherein the camera can be secured on the camera mounting support via the quick shoe plate 104' provided on the camera mounting support. The height of the camera relative to the camera connecting base can be adjusted by adjusting a height of the camera mounting support relative to the camera connecting base according to different heights of a lens mount 10.

The shouldering type photographing support according to the present disclosure, wherein the main frame 1 installed with the shouldering assembly 3 can be further installed with one or more supporting assemblies, according to a need in practical use.

The main frame 1 for coupling components according to the present disclosure, can be used to install various supporting assemblies and a shouldering assembly 3 to the main frame 1, the coupling components may comprise different connecting bases described herein, and any other devices used to install various supporting assemblies and the shouldering assembly 3 to the main frame 1.

The term "photographing" according to the present disclosure, comprises static image photographing and dynamic video recording. Accordingly, in addition to install a camera and lens on the main frame 1, a video recorder or other imaging device can be installed on the main frame 1 for any photographing purposes.

It is to be noted that, the support assemblies described herein may be detachably mounted by a locking device and may be substituted and combined as required to realize various usage states and purposes.

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

While the invention has been described in connection with one or more embodiments, it should be understood that the invention is not limited to those embodiments. On the contrary, the invention covers all alternatives, modifications and equivalents as may be included within the scope of the appended claims.

What is claimed is:

1. A shouldering photographing support, comprising:
   a main frame for coupling component, on which at least one connecting base for fixing a lens or camera is provided, wherein the main frame comprises installation surfaces axially extending along the main frame, at least one installation surface of the installation surfaces comprises mounting holes running through the at least one installation surface, a positioning convex rail is provided on both sides of the mounting holes, axially along the main frame, and the coupling component is fastened on the at least one installation surface by a shoulder nut;
   a shouldering assembly connected to the main frame, wherein the shouldering assembly being provided on a side of one end of the main frame and not in a same axis as the at least one connecting base, and the shouldering assembly being located in a left rear or right rear of the at least one connecting base; and
   a supporting assembly connected to the main frame, wherein the supporting assembly comprises a chest-supporting assembly, arm-supporting assembly, handheld assembly and supporting leg assembly, the shouldering assembly and the supporting assembly together provide supporting at multiple points for the main frame.

2. The shouldering photographing support according to claim 1, wherein the main frame has a cross-section of a hollow rectangle such that an interior of the main frame is axially cut through.

3. The shouldering photographing support according to claim 2, wherein the mounting hole is a gourd shaped hole.

4. The shouldering photographing support according to claim 1, wherein the installation surface of the main frame comprises an installation guide rail provided on top and/or bottom of the main frame, the installation guide rail comprises a Picatinny rail or a trapezoidal rail, and the supporting assembly is installed on the installation surface via a locking device.

5. The shouldering photographing support according to claim 1, wherein the shouldering assembly comprises: shouldering member, shouldering supporting arm, connecting components for shouldering member and shouldering supporting arm, and shouldering supporting arm connecting base assembly.

6. The shouldering photographing support according to claim 5, wherein the shouldering member is provided with a bearing part configured to touch an upper-shoulder, and a recoil bearing part designed according to ergonomics and configured to touch a location between the upper-shoulder and chest; the connecting components for the shouldering member and shouldering supporting arm comprise shouldering mount, connecting flange, shouldering front cover; the shouldering member is fixed and connected to the shouldering supporting arm via the shouldering mount, connecting flange and shouldering front cover; at least one end of the shouldering supporting arm is provided with a connecting section or connecting device, the other end of the shouldering supporting arm is connected to the shouldering member; the shouldering supporting arm connecting base assembly is provided with a connecting section or connecting device connecting with the connecting section or connecting device of the shouldering supporting arm, and the connecting base assembly is connected to a side of the main frame.

7. The shouldering photographing support according to claim 6, wherein the shouldering supporting arm further comprises a middle section that connects both ends thereof, the middle section extends to the left rear or the right rear relative to the main frame.

8. The shouldering photographing support according to claim 5, wherein a Picatinny rail or a trapezoidal rail extending vertically is provided on the shouldering supporting arm connecting base assembly, the shouldering supporting arm is locked on the Picatinny rail or trapezoidal rail via a locking device, such that a vertical position of the shouldering assembly can be adjusted.

9. The shouldering photographing support according to claim 6, wherein the connecting device of the shouldering supporting arm connecting base assembly is provided with the shoulder nut and a screw fitted with the shoulder nut, for mounting the connecting device on at least one of the mounting holes, such that an axial position of the shouldering assembly, along the main frame, can be adjusted.

10. The shouldering photographing support according to claim 1, wherein the chest-supporting assembly is provided with a rotatable chest-supporting member adapted with a chest surface, adjustable supporting arm and a fixed supporting arm; the adjustable supporting arm is respectively connected with the fixed supporting arm and chest-supporting member, wherein the chest-supporting member is connected with the adjustable supporting arm or with a tie-beam of the adjustable supporting arm; the adjustable supporting arm can be connected with a connecting device provided on the fixed supporting arm, and adjusted to a certain length of use; the chest-supporting assembly can be connected with the main frame via the connecting device on a fixed supporting arm seat.

11. The shouldering photographing support according to claim 1, wherein the arm-supporting assembly is provided with an arm-supporting member, an adjustable supporting arm and a fixed supporting arm; the adjustable supporting arm comprises an adjustable guide rail and a transverse shaft; the arm-supporting member has a first supporting face bearing an inner side of an elbow joint towards to a forearm, a second supporting face bearing a pivot of the elbow joint, and a third supporting face bearing the inner side of the elbow joint towards a upper arm; wherein the first, second and third supporting face of the arm-supporting member is designed according to ergonomics so as to adapted with a surface of the inner side of the elbow joint; the arm-supporting member is rotatably connected with the transverse shaft of the adjustable supporting arm, such that the arm-supporting member can be adjusted to a certain length of use; the arm-supporting assembly can be connected to the installation surface of the main frame via a connecting device provided on a fixed supporting arm seat, wherein the arm-supporting assembly and chest-supporting assembly are on a same side of the main frame.

12. The shouldering photographing support according to claim 1, wherein the handheld assembly is provided with a handgrip, all of sides of the handgrip are curved surfaces; the handgrip is provided with a connecting device, for connecting to the main frame via a connecting support and connecting base; the handgrip can be vertically connected to a side of the main frame, or be connected beneath the main frame and axially parallel with the main frame; a axial connecting position of the handheld assembly along the main frame can be adjusted, such that a holding distance of the handgrip can be adjusted.

13. The shouldering photographing support according to claim 1, wherein the supporting leg assembly is provided with a supporting arm assembly, the supporting arm assembly is consisted of an outer supporting arm and an inner supporting arm; the outer supporting arm is designed as a tubular shape, one end of which is connected with a supporting arm seat, another end is provided with a telescoping adjustable fastening device; the inner supporting arm is designed as a cylinder; the inner supporting arm is arranged inside the outer supporting arm, a supporting height of the supporting leg assembly can be adjusted by the telescoping adjustable fastening device; one end of the inner supporting arm is provided with a foot pad; the supporting leg assembly comprises a front supporting leg assembly and a rear supporting leg assembly, wherein each of the front supporting leg assembly and rear supporting leg assembly is provided with a single or a pair of supporting arm assembly.

14. The shouldering photographing support according to claim 1, wherein the main frame installed with the shouldering assembly are further installed with one or more supporting assemblies.

15. The shouldering photographing support according to claim 1, wherein the supporting assembly further comprises a detachable single-leg cane assembly.

16. The shouldering photographing support according to claim 1, wherein the coupling component comprises the at least one connecting base, the at least one connecting base comprises a quick locking device.

17. The shouldering photographing support according to claim 16, wherein the at least one connecting base can be connected to the main frame, the at least one connecting base comprises a lens connecting base and a camera connecting base respectively used to secure a lens and camera; a lens mount is connected to the lens connecting base via a quick shoe plate provided on a upper part of the lens connecting base, a lower part of the lens connecting base is connected on top the main frame; the lens connecting base can be axially displaced along the main frame according to a length of the lens; the camera connecting base is arranged on and abutted to one end of the main frame, a camera can be connected to the camera connecting base via a camera mounting support, wherein the camera can be secured on the camera mounting support via the quick shoe plate provided on the camera mounting support; a height of the camera relative to the camera connecting base can be adjusted by adjusting a height of the camera mounting support relative to the camera connecting base according to different heights of the lens mount.

18. The shouldering photographing support according to claim 17, wherein the camera is installed on one end of the main frame via the camera connecting base and camera mounting support, or installed on top of the main frame via the camera connecting base.

19. A shouldering photographing support, comprising:
a main frame for coupling component, on which at least one connecting base for fixing a lens or camera is provided, wherein the main frame comprises installation surfaces axially extending along the main frame, at least one installation surface of the installation surfaces comprises mounting holes running through the at least one installation surface, a positioning convex rail is provided on both sides of the mounting holes, axially along the main frame, and the coupling component is fastened on the at least one installation surface by a shoulder nut;
a shouldering assembly connected to the main frame, wherein the shouldering assembly being provided on a side of one end of the main frame and not in a same axis as the at least one connecting base, and the shouldering assembly being located in a left rear or right rear of the at least one connecting base; and
a supporting assembly connected to the main frame, wherein the supporting assembly comprises a chest-supporting assembly, arm-supporting assembly, handheld assembly and supporting leg assembly, the shouldering assembly and the supporting assembly together provide supporting at multiple points for the main frame.

* * * * *